United States Patent [19]

Guiver et al.

[11] Patent Number: 5,475,065
[45] Date of Patent: Dec. 12, 1995

[54] PROCESS FOR PRODUCING AZIDE-SUBSTITUTED AROMATIC POLYMERS AND THE PRODUCTS THEREOF

[75] Inventors: Michael D. Guiver, Ottawa; Gilles P. Robertson, Aylmer, both of Canada

[73] Assignee: National Research Council of Canada, Ottawa, Canada

[21] Appl. No.: 292,959

[22] Filed: Aug. 22, 1994

[30] Foreign Application Priority Data

Aug. 24, 1993 [GB] United Kingdom ............... 9317617

[51] Int. Cl.$^6$ .................. C08G 75/23; C08L 81/06
[52] U.S. Cl. ............... 525/535; 528/171; 528/175; 528/391; 552/8; 568/30; 568/34
[58] Field of Search ................... 525/535, 536; 528/171, 175, 388–391; 552/1–12; 568/30, 34–36

[56] References Cited

U.S. PATENT DOCUMENTS

| | | | |
|---|---|---|---|
| 4,797,457 | 1/1989 | Guiver et al. | 525/534 |
| 4,999,415 | 3/1991 | Guiver et al. | 528/171 |

OTHER PUBLICATIONS

P. Spagnolo et al., J. Organic Chemistry, vol. 47, 1982, pp. 3177–3180.
Reed et al., Tetrahedron Letters, vol. 24, 1983, pp. 3795–3798.

Primary Examiner—Melvyn I. Marquis
Assistant Examiner—D. Aylward
Attorney, Agent, or Firm—J. Wayne Anderson

[57] ABSTRACT

The invention disclosed relates to a process for producing azide-substituted aromatic polymers such as polysulfones, and to certain novel azide-substituted polysulfones so produced. The process involves attaching azide groups onto the aromatic rings of the polymers by first activating the attachment site by direct lithiation or bromination, followed by lithiation. The lithiated intermediates are converted substantially qantitatively to azides by reacting with a suitable azide, preferably tosyl azide, under substantially anhydrous conditions. Novel azide-substituted polysulfones containing from one to about three azide groups per repeat polymer unit were obtained, the degree of azide substitution being determined by the degree of lithiation. The azides may also be converted to other functional derivatives such as primary amines and cross-linked membranes.

8 Claims, 16 Drawing Sheets

4a  R is H
4b  R is Li
4c  R is N=N=N

8a  R is Li
8b  R is N=N=N

Fig. 6b
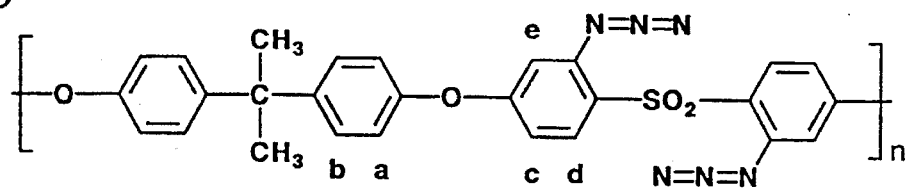
Fig. 6a
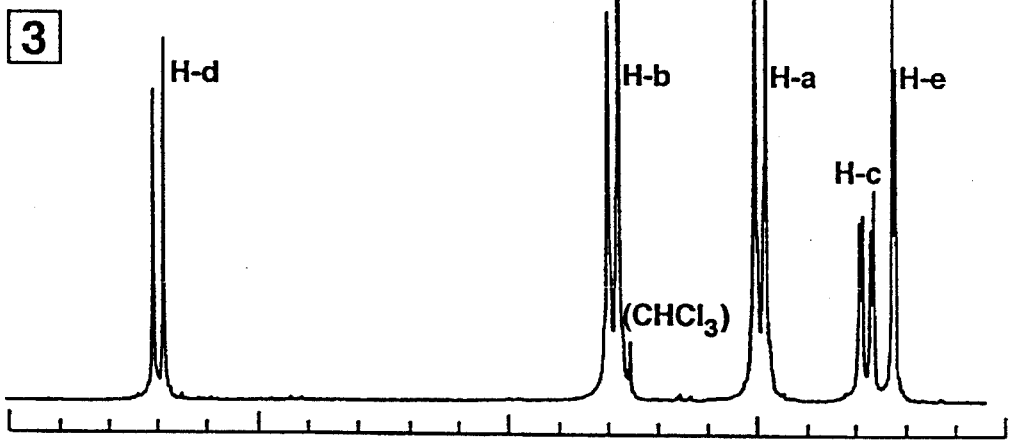
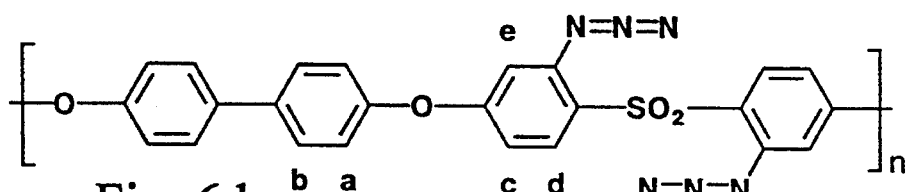
Fig. 6d
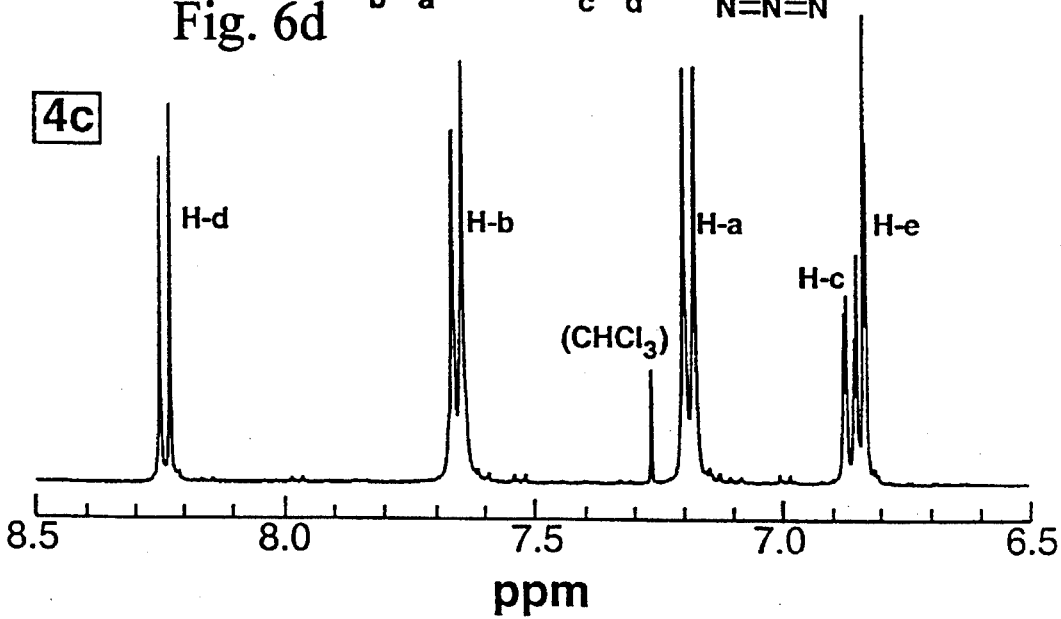
Fig. 6c

Fig. 7b
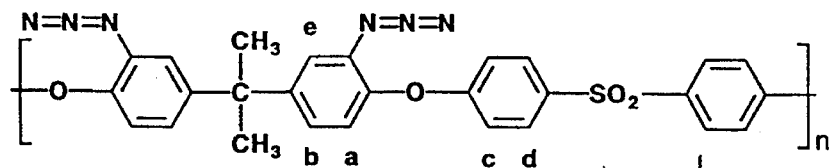
Fig. 7a
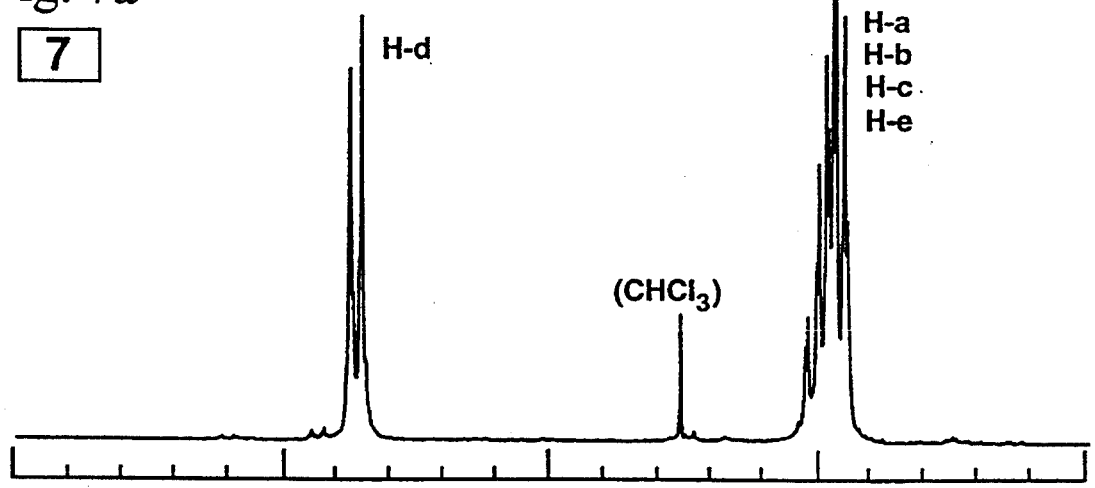
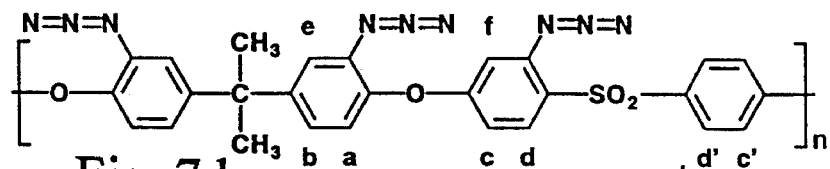
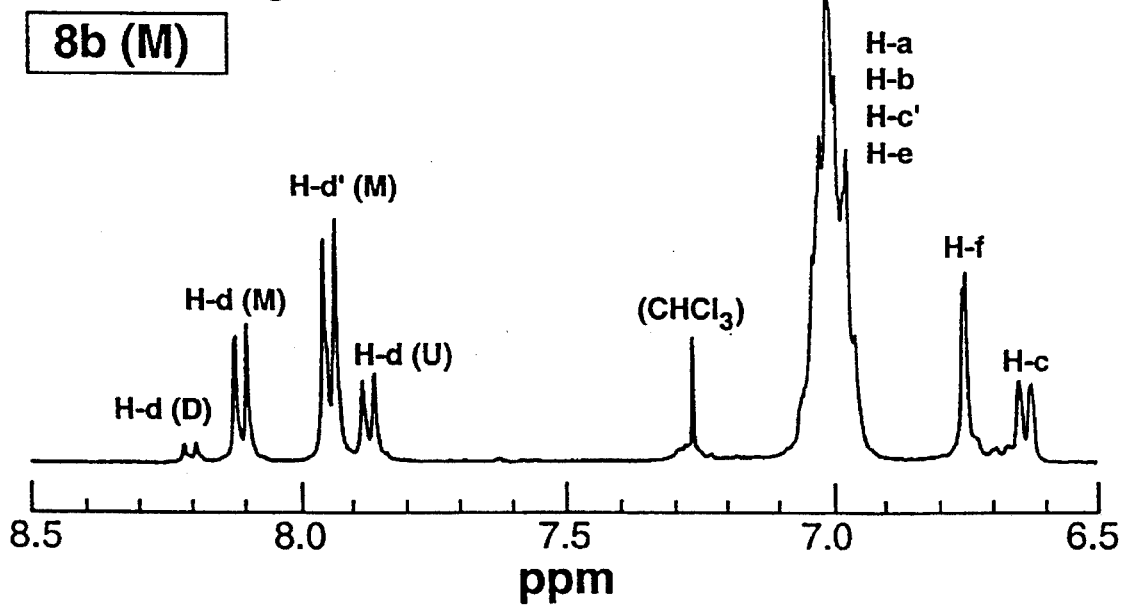
Fig. 7c

PROCESS FOR PRODUCING AZIDE-SUBSTITUTED AROMATIC POLYMERS AND THE PRODUCTS THEREOF

BACKGROUND OF THE INVENTION

1. Field of the Invention

This invention relates to a process for producing an azide-substituted aromatic polymer and to the novel azide-substituted aromatic polymers (e.g. polysulfones) so produced.

Azides are known to be thermally and photochemically labile groups capable of being readily transformed into a number of other useful derivatives, for example, primary amines which are themselves difficult to directly attach to polymers. 2. Description of the Prior Art Several examples of polymeric alkyl azides produced by chemical modification of polymers have been reported in the literature. Typically, azide groups are introduced onto polymers containing chloroalkyl groups by reaction with sodium azide. The azides can then be converted to various other derivatives. Specifically, Cohen has reported the preparation of several 1,3-dipolar cycloaddition products from poly(vinylbenzyl azide).

However, as will be apparent hereinafter, the azidization of aromatic polymers cannot be done in this manner, and insofar as Applicants' are aware, azide derivatives of aromatic polymers, including polyphenylene ethers, polysulfones, halogenated polysulfones, polyarylsulfones, halogenated polyarylsulfones, polyvinylthiophenes, polystyrenes, halogenated polystyrenes and co-polymers thereof have not been made heretofore.

Polysulfone is an engineering thermoplastic widely used as a membrane material in the area of liquid and gas separations. It has been a goal of Applicants' work to tailor the membrane separation characteristics of this polymer and increase the scope of its use by introducing various functional groups by chemical modification. For example, we have obtained several U.S. Patents on the subject of direct lithiation and halogenation-lithiation of polysulfones as a means of producing carboxyl, hydroxyl and a number of other derivatives. See the following U.S. Patents.

Direct lithiation of polysulfone.

U.S. Pat. No. 4,797,457, issued Jan. 10, 1989, Preparation of substituted polysulfones through ortho-metalated intermediates, M. D. Guiver, J. W. ApSimon & O. Kutowy. U.S. Pat. No. 4,833,219, issued 23 May 1989, Preparation of substituted polysulfones by metalation, M. D. Guiver, J. W. ApSimon & O. Kutowy.

Halogenation of polysulfone

U.S. Pat. No. 4,996,271, issued 26 Feb. 1991, A Method of Manufacturing Halogenated Aromatic Polysulfone Compounds and the Compounds so Produced, M.D. Guiver & O. Kutowy.

Halogenation-lithiation of polysulfone

U.S. Pat. No. 4,999,415, issued 12 March 1991, Aromatic Polysulfone Compounds and their Manufacture, M.D. Guiver & O. Kutowy.

Lithiated polymers can be converted to aminated polymers by reacting the lithiated polymer with a primary amine electrophile. Typically, this electrophile is methoxylamine or the lithium salt of methoxylamine. While this reagent works well with many smaller lithiated molecules, it is generally not an efficient reagent when used for polymer amination.

As an example from our experiments, when the lithium salt of methoxylamine (i.e. $CH_3ONHLi$) was reacted with a lithiated polysulfone containing an average of 1.2 lithium atoms per repeat unit, only 17% conversion of Li atoms to amine groups (DS=0.20) occurred and the polymer underwent some crosslinking.

Hinke and Staude, J. Appl. Polym. Sci., 42, 2951–2958 (1991), report that the amination of lithiated polysulfone with methoxylamine (not the lithium-salt i.e. $CH_3ONH_2$) gave aminated polysulfone of DS only 0.12.

Other primary amine electrophile reagents which are reported to convert lithium atoms to amine groups in small molecules are ineffective when applied to lithiated polysulfone.

Trimethylsilyl azide reacts with a lithiated polysulfone to give a trimethylsilyl group rather than an azide which can be readily converted to a primary amine. Trimethylsilylmethyl azide does not react at all, and diphenylphosphoryl azide reacts to give a product that is not an azide or an amine.

It was also a goal of our work was to develop a better method than the conventional nitration-reduction pathway for derivatization of aromatic polymers such as polysulfones, with primary amine groups. While nitration of smaller molecules is a very common and useful procedure, a frequent problem with nitration of polymers is the tendency for chain degradation to occur. The resulting nitrated polymers are relatively resistant to reduction and can lead to incompletely reduced products. As well, we have experienced difficulty in our laboratory isolating the reduced polymers by some of the reported literature procedures.

It is known to use tosyl azide to convert small lithiated molecules to azides and primary amines (see J. Reed and V. Sniekus, below), but the approach has not been applied to any polymer systems to the best of our knowledge. As mentioned before, there are many reagents available for this type of conversion. Many of these are ineffective in that they cause chain degradation, chain crosslinking, have poor conversion efficiency or they do not work at all when applied to polymer modification.

The following are references on the use of tosyl azide in the conversion to azides:

Use of tosyl azide for converting non-polymeric lithiated molecules into amino derivatives:

General Route for the Facile Transformation of Ortho-Substituted Lithiobithienyls into Amino Derivatives, P. Spagnolo and P. Zanirato, J. Org. Chem., 47, 3177–3180 (1982).

Ortho-Amination of Lithiated Tertiary Benzamides. Short Route to Polysubstituted Anthranilamides, J. N. Reed and V. Sniekus, Tetrahedron Lett., 24, 3795–3798, (1983).

A review of amination reagents can be found in the reference: Electrophilic Amination of Carbanions, E. Erdik and M. Ay, Chem. Rev. , 89, 1947–1980 (1989).

Modification of other polymers to polymeric azides, namely, poly (vinylbenzyl chloride) to poly (vinylbenzyl azide), has been reported by H. L. Cohen, J. Polym. Sci., Polym. Chem., 19, 1337–1347 (1981). Conversion of polyhaloethyl acrylates, poly(vinyl chloride), poly(epichlorohydrin) and other poly(halohydrins) to polymeric azides has been reported by H. L. Cohen, Preparation of Polymeric Azides. II. The Preparation and Reactions of Various Polymeric Azides. J. Polym. Sci., Polym. Chem., 19, 3269–3284 (1981). In the latter paper, references are also made to the work of other authors for converting poly(vinyl chloride), poly (epichlorohydrin) and poly (3-chloromethyl-2,6-dimethylphenylene oxide) to polymeric azides.

To obtain the azide, the above prior art uses an approach in which, in most cases, an aliphatic chloride functional group on the polymer is converted with sodium azide. This requires the presence of an aliphatic chloride group (i.e. chloromethyl or chloromethylene) to work.

SUMMARY OF THE INVENTION

According to one aspect of the invention, there is provided a novel process for producing an azide-substituted aromatic polymer, comprising (a) reacting an aromatic polymer capable of being lithiated, selected from the group consisting of polyphenylene ethers, polysulfones, halogenated polysulfones, polyarylsulfones, halogenated polyarylsulfones, polyvinylthiophenes, polystyrenes, halogenated polystyrenes and co-polymers thereof, with a suitable lithiating agent to provide a lithiated aromatic polymer intermediate, and (b) reacting the lithiated aromatic polymer intermediate with a suitable azide under substantially anhydrous conditions, so as to substantially quantitatively replace lithium by an azide group.

This process allows a substantially quantitative conversion of lithium sites to azide sites, and a substantially quantitative subsequent conversion of the azide sites to other functional derivatives, such as primary amines, triazoles and cross-linked derivatives. No chain degradation was observed.

The lithiation of the aromatic polymer may be done directly, or by prior to step (a), brominating the aromatic polymer and then lithiating the brominated derivative.

When the aromatic polymer includes a phenyl, halogenated phenyl, or thiophene ring, and an oxygen-ether and or sulfone group, the lithiation in step (a) or the preliminary bromination is effected ortho to the oxygen-ether, sulfur/thiophene and/or sulfone group.

The degree of lithiation is controlled by the stoichiometric amount(molar ratio) of the lithiating agent used. Generally, from one to about three aromatic ring sites are lithiated. This may also be referred to as Degree of Substitution or DS.

Suitable lithiating agents include n-butyllithium, secbutyllithium, iso-butyllithium, tert-butyllithium, methyllithium, ethyllithium, propyllithium, phenyllithium, and lithium diisopropylamide, with n-butyllithium being preferred.

The suitable azide is an aryl sulfonated azide, preferably a lower-alkyl-substituted phenyl sulfonyl azide. As will be apparent from the experimental results which follow, substantially pure p-toluenesulfonylazide is most preferred. The starting polymer for step (a) is conveniently dissolved or suspended in a suitable solvent which is substantially unreactive with the lithiating agent and the polymer.

Examples of suitable solvents include tetrahydrofuran, ether, hexane and dimethyl ethylene glycol.

The reaction temperature for steps (a) and (b) may be in the range of about −10° to about −78° C. (the temperature of dry ice/methanol). Preferably, the reaction temperature for step (b) is in the range of about −50° to about −78° C. At higher temperatures, while lithiation likely will occur, other competing reactions also tend to occur, with formation of a precipitated insoluble product. It is expected that lithiation would still readily occur at lower temperatures.

If desired, the lithiation rate can be enhanced by the addition of a co-ordinating agent or catalyst, such as tetramethylethylenediamine(TMEDA), hexamethyl-phosphoric triamide(HMPT) or other tertiary amines.

The novel azide-substituted aromatic polymers according to the invention may be recovered from solution by adding water.

Various other functional derivatives may be produced by reacting the azide-substituted aromatic polymer so formed, by conventional means. For example, a corresponding primary amine derivative may be produced by reacting the azide with a suitable reducing agent, such as sodium borohydride. It will be appreciated by those skilled in the art that other similar reducing agents may also be used.

Further, if the azide is reacted by 1,3-dipolar cycloaddition with an acetylenic compound, a corresponding triazole derivative is formed.

Also, if a film of the azide is cast and then cured by heat or radiation, a cross-linked derivative is produced.

According to another aspect of the invention, a novel azide-substituted aromatic polymer is provided, said polymer being selected from the group consisting of A) an azide substituted bisphenol polysulfone containing a polymer repeat unit of formula (I):

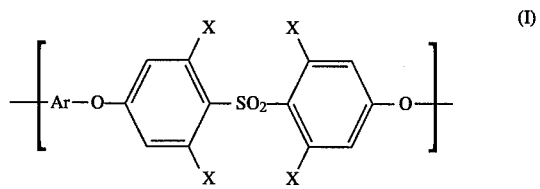

wherein Ar is an aromatic radical selected from the group consisting of:

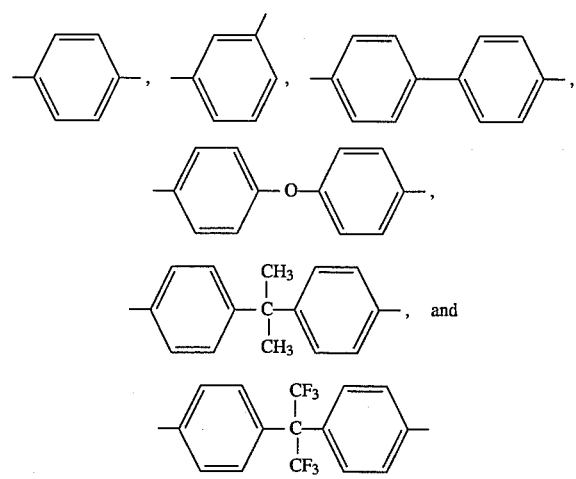

wherein at least one X per polymer chain is $N_3$, and from one to about three X per polymer repeat unit is $N_3$, the remainder of X being H or halogen, and B) an azide substituted bisphenol polysulfone containing a polymer repeat unit of formula (II):

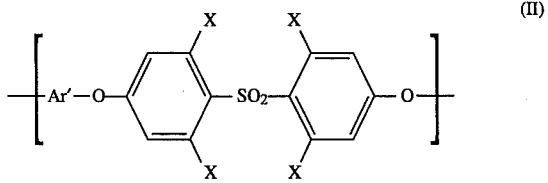

(II)

wherein Ar' is a substituted radical selected from the group consisting of:

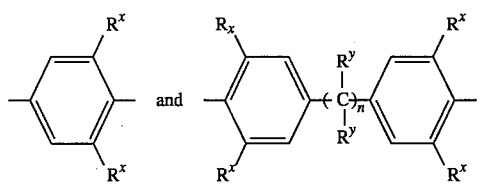

wherein $R^x$ is azide, hydrogen, alkyl or halogen; $R^y$ is lower alkyl, halogenated lower alkyl or aryl; n is zero or one and wherein at least one X and/or $R^x$ per polymer chain is $N_3$, and from one to about three X and/or $R^x$ per polymer repeat unit is $N_3$, the remainder of X and/or $R^x$ being hydrogen, alkyl or halogen.

Typically, the polysulfones according to the invention contain at least ten, and preferably from about 50 to about 80, repeat units of formula I or II. Moreover, the average molecular weight of such polysulfones is generally above about 10,000, and preferably from about 25,000 to about 80,000.

In one particular group of such aromatic polysulfone polymers, an azide-substituted aromatic polymer is provided, said polymer containing repeat units of the formula

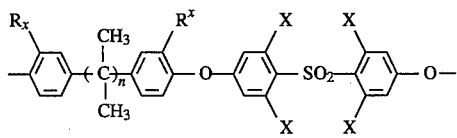

wherein $R^x$ is azide, hydrogen, alkyl or halogen; n is zero or one and wherein at least one X and/or $R^x$ per polymer chain is $N_3$, and from one to about three X and/or $R^x$ per polymer repeat unit is $N_3$, the remainder of X and/or $R^x$ being hydrogen, alkyl or halogen.

BRIEF DESCRIPTION OF THE DRAWINGS

In the drawings,

FIGS. 6a and 6c illustrate comparative $^1$H-NMR spectra (aromatic region) of ortho-sulfone azide derivatives of polysulfone 3, and of polyarylsulfone 4c;

FIGS. 6b and 6d illustrate the structure of the compounds 3 and 4c shown in FIGS. 6a and 6c;

FIGS. 7a and 7c illustrate comparative $^1$H-NMR spectra (aromatic region) of ortho-ether polysulfone azide 7, and of polysulfone triazide 8b;

FIGS. 7b and 7d illustrate the structure of the compounds 7 and 8b shown in FIGS. 7a and 7c;

DETAILED DESCRIPTION OF THE INVENTION

In general, polysulfones modified by direct lithiation led to highly regioselective azide substitution ortho to sulfone. By this route, homopolymer type products could be prepared containing two azide groups per repeat unit. Because of the substantially quantitative nature of the direct lithiation chemistry, lower amounts of azide substitution were obtained simply by controlling the molar equivalent of lithiating agent added to the polymer, i.e. by adding less lithiating agent.

Lithiation of di-brominated polysulfone resulted predominately in a lithium-halogen exchange reaction leading to polymer with two azide groups in the bisphenol ring ortho to the ether linkage. This reaction was regioselective to this site with only a minor amount of the competing ortho-sulfone product evident. Polysulfone containing close to three azide groups per repeat unit was obtained using 3 molar equivalents of lithiating agent with the di-brominated polymer.

As will be apparent from the specific examples which follow, polysulfones were lithiated by two different routes. In the first method, Udel® P3500 polysulfone (PSf) was reacted directly with n-butyllithium at reduced temperature, resulting in a tetrahydrofuran (THF) soluble intermediate containing up to two lithium atoms per repeat unit (degree of substitution or DS=2) ortho to the sulfone linkage by the methods described in our aforementioned U.S. Pat. Nos. 4,797,457 and 4,833,219. This chemistry, known as ortho-lithiation or directed metalation, is highly regioselective because of the powerful directing ability of the sulfone group. The reaction is also rapid and substantially quantitative, such that the degree of lithiation on the polymer can be controlled by the molar ratio of n-butyllithium.

In the second method, polysulfone was first brominated by the method described in our aforementioned U.S. Pat. No. 4,996,271 to a DS of two on the bisphenol portion of the chain. Treatment of the di-brominated polymer with n-butyllithium by the method described in our aforementioned U.S. Pat. No. 4,999,415 resulted in a lithium-halogen exchange reaction predominately, giving almost two lithium atoms ortho to ether linkage and with a minor quantity of ortho-lithiation product. We have found that it is more difficult to obtain regioselectively functionalized polysulfones by lithiating polymers containing less than two bromine atoms per repeat unit. Bromine appears to deactivate the proximal ortho-sulfone site to ortho-lithiation, so that when the bromine DS= 2, only minor amounts of ortho-sulfone sites are lithiated. However, when the bromine DS<2, there is competition for lithiation at both the halogen and ortho-sulfone sites (approximate ratio is 2:1 respectively). Lower temperatures (−70° C.) favour lithium-halogen exchange.

Figure 1:
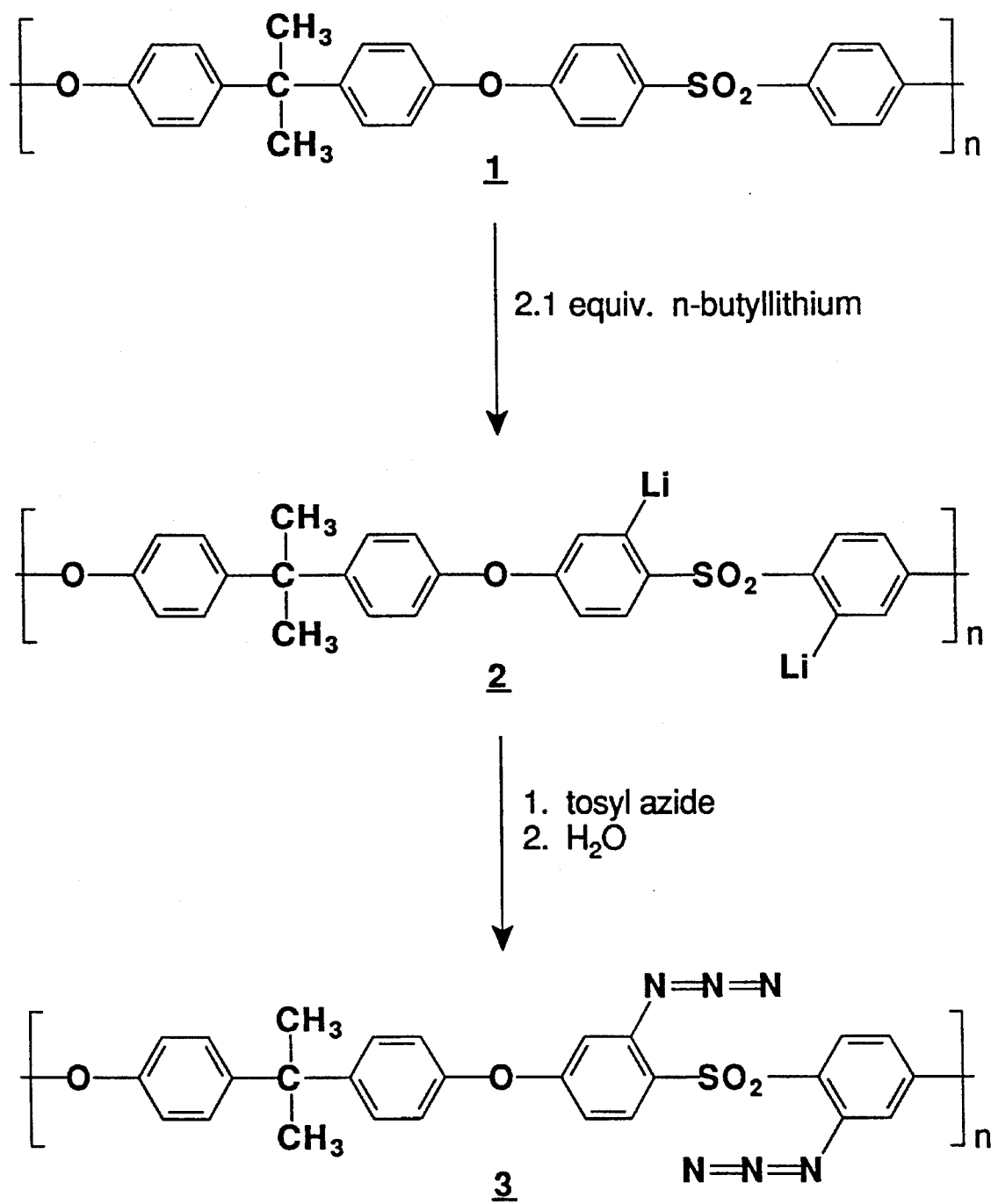
FIG. 1 illustrates the reaction scheme for preparing the ortho-sulfone azide derivative 3 from commercial Udel P3500 polysulfone 1 via a lithiated intermediate 2.

More specifically, FIG. 1 shows the reaction scheme for preparing the DS=2 ortho-sulfone azide derivative from commercial Udel® P3500 polysulfone. A cooled 5.5% solution of polysulfone 1 was lithiated with 2.15 molar equivalents n-butyllithium to give a soluble viscous dilithiated intermediate 2. Tosyl azide was added, presumably to give a labile intermediate sulfonyltriazene which fragmented to polysulfone azide 3 upon aqueous work-up. The pale yellow product 3 contained almost two azide groups ortho to sulfone per repeat unit. Using more concentrated solutions of 1 resulted in some insolubility of the azide product 3. While excess tosyl azide was used to quench the lithiated polymer, a lesser amount may be sufficient because the procedure was not optimized. Elemental analysis for nitrogen indicated the azide derivative had over 98% of the theoretical nitrogen content for repeat unit of structure 3. The polymer was soluble in $CHCl_3$, THF and polar aprotic solvents and was photosensitive and thermally unstable.

Polysulfone azides with lower DS were readily prepared by using lower molar equivalents of n-butyllithium, and gave products with the expected DS.

Figure 2:
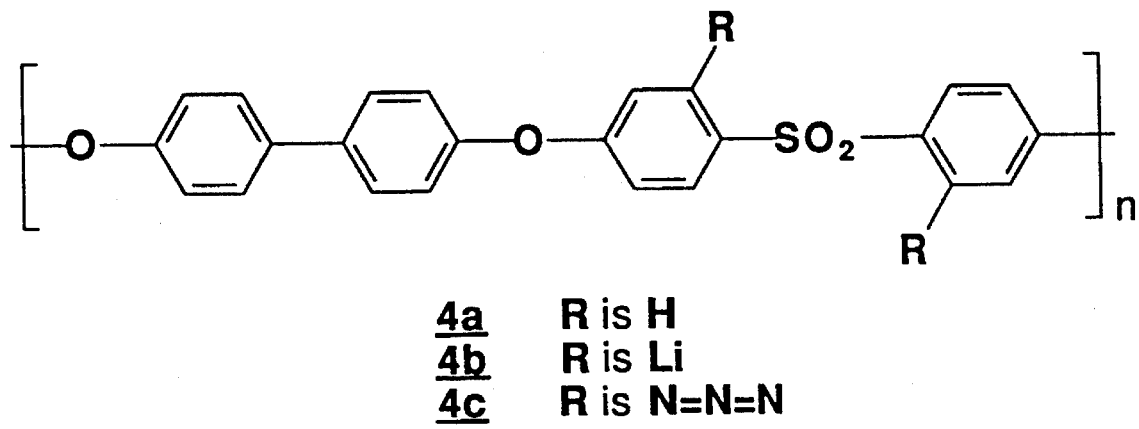
FIG. 2 illustrates structures of commercial Radel R5000 polyarylsulfone 4a, providing the diazide derivative 4c from lithiated intermediate 4b.

This reaction was equally effective on commercial Radel® R5000 polyarylsulfone 4a, providing the diazide derivative 4c from the lithiated intermediate 4b as shown in FIG. 2. The difference with polyarylsulfone was its poor solubility in THF, thus requiring a more dilute solution for the lithiation step.

Figure 3:
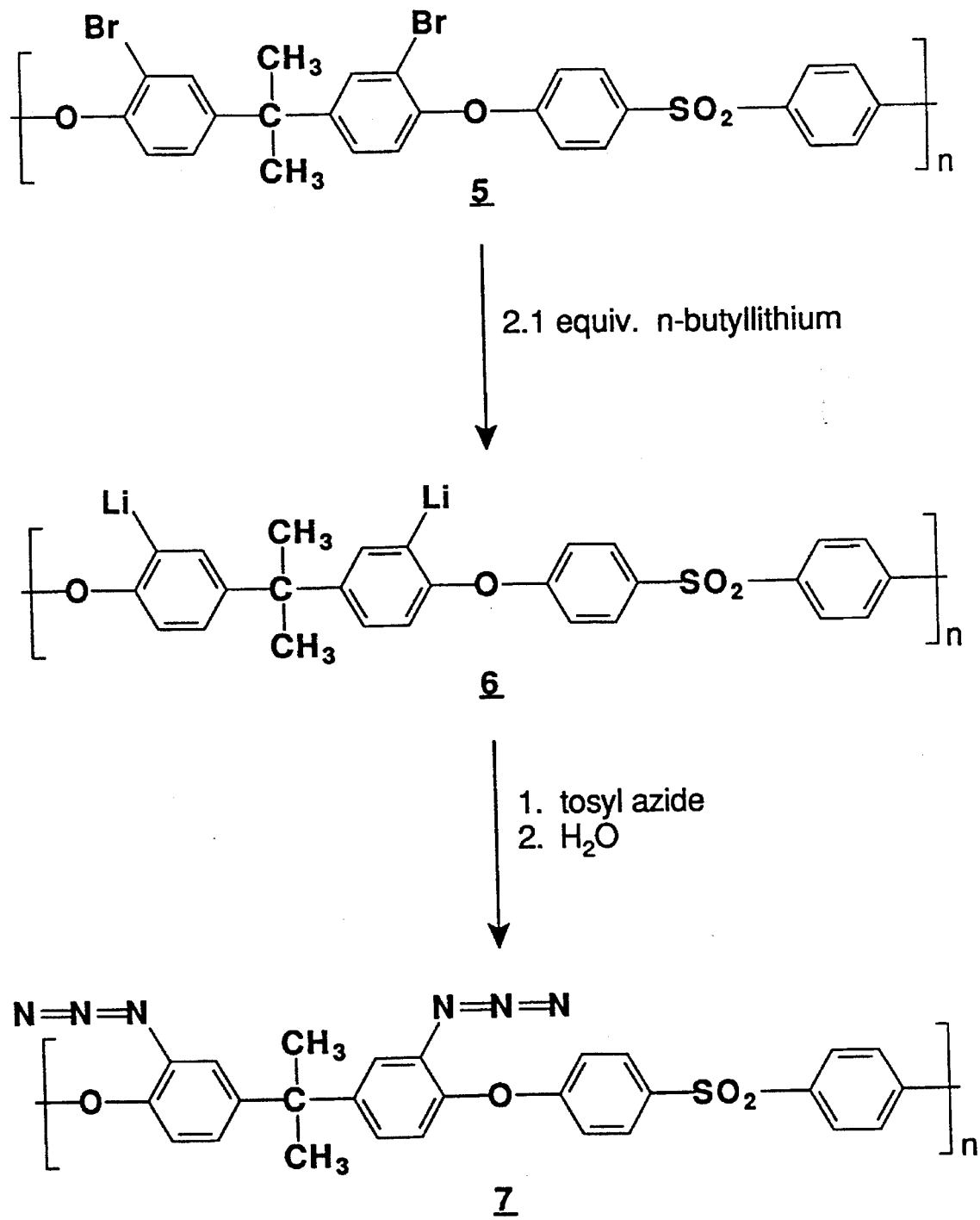
FIG. 3 illustrates the reaction scheme for preparing DS=2 ortho-ether azide derivative 7 from di-brominated polysulfone 5 via lithiated intermediate 6.
Figure 4:
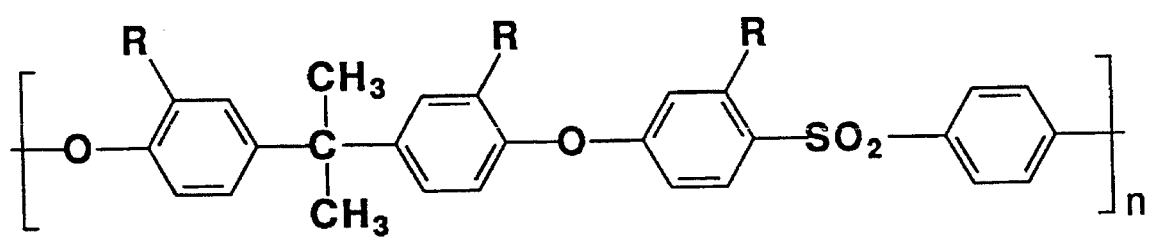
FIG. 4 illustrates structures of trilithiated intermediate 8a and polysulfone triazide 8b.

An ortho-ether polysulfone diazide derivative was prepared by the route shown in FIG. 3 from di-brominated polysulfone. Specifically, di-brominated polysulfone 5 was lithiated with 2.15 molar equivalents n-butyllithium to give a soluble dilithiated intermediate 6 which was reacted with tosyl azide to give polysulfone azide 7 upon aqueous work-up. The product had a nitrogen content of 100.5% of the theoretical value for repeat unit of the structure 7. Product 7 is apparently more photosensitive than 3. Ortho-ether azide polymers with DS<2 were not made because when the bromine DS<2, competition for lithiation at both the halogen and ortho-sulfone sites would lead to a polymer containing a variety of different repeat units. However, highly substituted azide polymer with DS>2 could be achieved by treating 5 with 3.1 molar equivalents of n-butyllithium. Once the bromine atoms are exchanged by lithium, the third mole of n-butyllithium lithiates the ortho-sulfone site to give a THF insoluble trilithiated intermediate 8a (FIG. 4). After treatment of 8a with tosyl azide, the polymer 8b had a high loading of azide (DS=2.75 by NMR) on the polymer chain, slightly less than the theoretical DS of 3.0. Polymer azide 8b had a nitrogen content of 94.3% of the theoretical value of a triazide repeat unit, giving a DS=2.83 by elemental analysis. This polymer is particularly photosensitive and less thermally stable than any of the other polymeric azides. These examples demonstrate the high control of DS and regioselectivity of the ortho-lithiation process and bromination-lithiation modification process in producing homopolymer type derivatives.

EXAMPLES

Materials and methods

Udel® P-3500 and Radel® R5000 (Amoco Performance Products, Inc.) were dried at 120° C. prior to use. Reagent grade chemicals were used as received. Lithiation reactions were performed under an inert atmosphere of dry argon in glassware that had been dried overnight at 120° C. n-Butyllithium 10M hexane solution and other reagent grade chemicals were used as received. Tetrahydrofuran (THF) was distilled over lithium aluminum hydride and under argon. The reaction vessel was a 3 L 3 neck glass flask equipped with a high torque mechanical paddle stirrer, gas inlet, and septum. Dibrominated polysulfone starting material for azide functionalization ortho to the ether linkage was prepared according to a previously published procedure. The modified polymers were dried in a vacuum oven.

Tosyl azide was prepared as follows. A solution of sodium azide (58.5 g, 0.90 tool) in distilled water (170 mL) was quickly added to a stirred suspension (partly in solution) of p-toluenesulfonyl chloride (143.0 g, 0.75 tool) in isopropanol (850 mL) contained in a beaker at room temperature. The mixture was stirred for one hour, then poured into 3 L of distilled water and stirred for one more hour. The separated oily tosyl azide was washed three times with water, dried over anhydrous magnesium sulfate, then dried by stirring under vacuum. It is important for its use as a reagent in the lithiation reaction that tosyl azide is substantially pure (free of impurities) and contains a negligible amount of water (measured by proton NMR). 114 g of colourless tosyl azide oil was obtained (yield 77%). A 95% yield could be obtained by extracting the drying agent with chloroform. $^1$HNMR: $\delta$=7.84 H-ortho-sulfonyl (2H d, J≈8.3); $\delta$=7.41 H-orthomethyl (2H d, J≈8.3); $\delta$=2.49 Me (3H s).

Proton and carbon spectra were obtained on a Bruker AM-400 spectrometer operating at a proton frequency of 400.13 MHz and a carbon frequency of 100.61 MHz. Chemical shifts are expressed in parts per million (ppm) and the spectral resonances are designated broadened (br.), singlet (s), doublet (d) and multipier (m). Coupling constants (J) are in Hertz. Unmodified, mono-substituted and di-substituted repeat units are designated U, M, and D respectively. Infrared (IR) spectra were measured on a Nicolet 520 FTIR Spectrometer. Polymer samples were mounted by evaporating the solvent from a polymer solution on a NaCl window. Gel permeation chromatography (GPC) measurements were made on THF polymer solutions using a Waters 510 pump, Waters 996 UV detector and a selection of μ-Styragel columns.

Examples 1–5 serve to illustrate the substantially quantitative preparation of polysulfone azides.

Example 1

Preparation of polysulfone (ortho-sulfone) azide (DS= 2.0) composed of repeat units nominally of the structure:

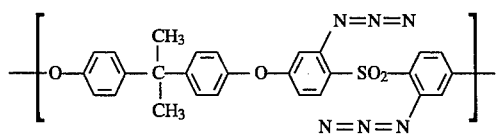

A solution of polysulfone (44.2 g, 0.10 mol) in THF (800 mL) was cooled to −78° C. by immersion in a dry-ice/alcohol bath. n-Butyllithium (21.5 mL, 0.215 mol) was injected drop-wise at a rate of 30 mL/h using a syringe pump. The mixture initially turned green, then later developed a brown colouration and became more viscous. It was stirred for 30 minutes following the n-butyllithium addition. A solution of tosyl azide (59.1 g, 0.30 mol) in THF (60 mL) under argon was cooled to −35° C. and poured promptly into the reaction flask. The polymer precipitated immediately, but within 5 minutes changed to a creamy yellow homogeneous suspension as it was stirred during 15 minutes at −78° C. The temperature of the cold bath was then gradually warmed to −50° C. over a period of 90 minutes when the reaction mixture abruptly changed to a thick gel, then within a few minutes to a clear yellow liquid. The solution was stirred at −50° C. for 15 minutes and then mixed with 5 L of ethanol-water (2:3 ratio) in a Waring blender. The resulting cloudy white solution was transferred to a beaker and stirred. Water (~1 L) was immediately added slowly until the yellowish polysulfone azide precipitated from solution. The supernatant was decanted and the polymer was washed three times by stirring for several hours with warm ethanol-water (4:1 ratio) to remove residual tosyl azide. After filtration, the polymer was dried in a vacuum oven at 25° C. The pale yellow product (49.8 g, 95% yield) contains almost two azide groups ortho to sulfone per polysulfone repeat unit and is photosensitive and thermally unstable.

$^1$H-NMR: PSf-(ortho-sulfone-$N_3$) $_{(DS=2.0)}$: δ=8.19 H-d (2H d J≈8.8); δ=7.29 H-b (4H d J≈8.7); δ=7.00 H-a (4H d J≈8.7); δ=6.78 H-c (2H dd J≈8.8, J≈2.1); δ=6.74 H-e (2H d J≈2.1); δ=1.73 CMe$_2$ (6H s). Elemental Analysis: PSf-$N_{3(DS=2.0)}$ ($C_{27}H_{20}N_6O_4S$): Calc. C 61.82%, H 3.84%, N 16.02%, O 12.2%, S 6.11%. Found C 61.69%, H 3.78% N 15.75% S 6.07% IR: PSf-(ortho-sulfone-$N_3$) $_{(DS=2.0)}$ -N=N=N asym. str. 2118 cm$^{-1}$ strong.

Example 2

Preparation of polysulfone (ortho-sulfone) azide (DS= 1.0) containing repeat units nominally of the structure:

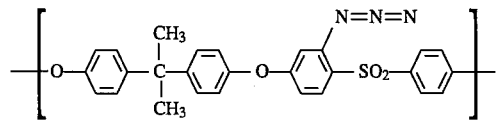

The procedure was repeated as before, but using 11.0 mL n-butyllithium (0.11 tool) to lithiate polysulfone and using 29.5 g tosyl azide (0.15 mol) in 30 mL THF. The pale yellow product was recovered as before (46.0 g, 95% yield) and contains an average of almost one azide group ortho to sulfone per polysulfone repeat unit. $^1$H-NMR: PSf-(ortho-sulfone-$N_3$) $_{(DS=1.0)}$: δ=8.20 H-d (D), (d); δ=8.10 H-d (M), (d); δ=7.92 H-d' (M), (d); δ=7.85 H-d (U), (d); δ=7.23–7.31 H-b's (U, M, D), (m); δ=6.92–7.03 H-c (U) and H-a's (U, M, D), (m); δ=6.74–6.81 H-c (M, D) H-e (M, D), (m); δ=1.71 CMe$_2$ (6H s). Elemental Analysis: PSf-$N_3$ $_{(DS=1.0)}$ ($C_{27}H_{21}N_3O_4S$): Calc. C 67.07%, H 4.38%, N 8.69%, O 13.24%, S 6.63. Found C 66.82%, H 4.37%, N 8.13%, S 6.29%.

Example 3

Preparation of Polyarylsulfone (ortho-sulfone) azide (DS= 2.0) composed of repeat units nominally of the structure:

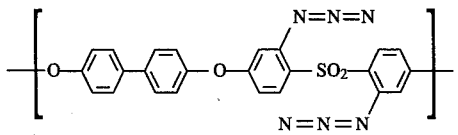

A solution of Radel® R5000 polyarylsulfone (4.00 g, 0.010 mol) in THF (160 mL) was cooled to −78° C. by immersion in a dry-ice/alcohol bath. It should be noted that the polymer is only completely soluble when cooled. n-Butyllithium (2.15 mL, 0.0215 mol) was injected drop-wise using a syringe pump. The mixture initially turned pale yellow, then later darker yellow and became more viscous. It was stirred for 15 minutes after the n-butyllithium addition was completed, then a solution of tosyl azide (5.91 g, 0.03 mol) in THF (6 mL) cooled at −35° C. under argon was poured promptly into the reaction flask. The polymer precipitated immediately, but within 5 minutes changed to a creamy yellow homogeneous suspension. The temperature of the cold bath was gradually warmed to −50° C. (over 60 min) at which point the mixture abruptly changed to a thick paste, and then within a few minutes to a clear yellow liquid. The clear solution was stirred at −50° C. for 5 min, then mixed with 700 mL of ethanol-water (1:2 ratio) in a Waring blender. The resulting white polymer suspension was transferred to a beaker and stirred. Water (~200 mL) was immediately added slowly until the yellowish polysulfone azide precipitated from solution. The supernatant was decanted and the polymer was washed three times by stirring it with warm ethanol-water (4:1 ratio). After filtration, the polymer was dried in a vacuum oven at 25° C. The pale yellow product (4.50 g, 93% yield) contains almost two azide groups ortho to sulfone per polyarylsulfone repeat unit and is photosensitive and thermally unstable. The polymer can be purified by dissolving it into cold chloroform, filtering through a glass frit and precipitating in ethanol. $^1$H-NMR: Radel-PSf-(ortho-sulfone-N$_3$)$_{(DS=2.0)}$ (cold CDCl$_3$): δ=8.24 H-d (2H d J≈8.8); δ=7.65 H-b (4H d J≈8.7); δ=7.19 H-a (4H d J≈8.7); δ=6.86 H-c (2H dd J≈8.8, J≈2.2); ≈6.83 H-e (2H d J≈2.2). IR: Radel-PSf-(ortho-sulfone-N$_3$)$_{(DS=2.0)}$ -N=N=N asym. str. 2116 cm$^{-1}$ strong.

Example 4

Preparation of polysulfone (ortho-ether) azide (DS=2.0) composed of repeat units nominally of the structure:

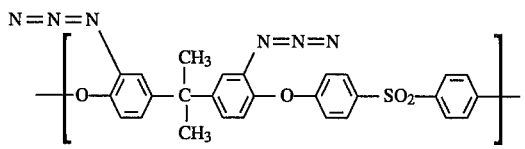

A solution of di-brominated polysulfone (60.0 g, 0.10 mol) in THF (1100 mL) was cooled to −78° C by immersion in a dry-ice/alcohol bath. The polymer was lithiated with n-butyllithium (21.5 mL, 0.215 mol) then reacted with a solution of tosyl azide (59.1 g, 0.30 tool) in THF (60 mL) as before. The polymer precipitated immediately, then changed to a creamy yellow suspension as it was stirred during 15 minutes at −78° C. The temperature of the cold bath was then gradually increased to −50° C. over a 90 minute period. then the suspension was stirred at −50° C. for 15 minutes. The creamy yellow suspension, which did not form a clear solution as before, was mixed with 6 L of ethanol-water (2:3 ratio) in a Waring blender. The resulting yellow solution was transferred to a beaker and stirred. Water (~1 L) was immediately added slowly until the yellowish polysulfone azide precipitated from solution. The polymer was recovered as before. The pale yellow product (49.8 g, 95% yield) contains almost two azide groups ortho to ether per polysulfone repeat unit and is more photosensitive and thermally unstable than the ortho-sulfone product. $^1$H-NMR: PSf-(ortho-ether-N$_3$)$_{(DS=2.0)}$: δ=7-87 H-d (4H d); δ=6.95–7.03 remainder of protons (m) ; δ=1.71 CMe$_2$ (6H s) . Elemental Analysis: PSf-N$_{3(DS=2.0)}$ (C$_{27}$H$_{20}$N$_6$O$_4$S): Calc. C 61.82%, H 3.84%, N 16.02%, O 12.2%, S 6.11%. Found C 61.14%, H 3.78%, N 16.10%, S 6.45%. IR: PSf-(ortho-ether-N$_3$)$_{(DS=2.0)}$ -N=N=N asym. str. 2117 cm$^{-1}$ strong.

Example 5

Preparation of polysulfone (ortho-ether, ortho-sulfone) azide (DS=2.75) containing repeat units nominally of the structure:

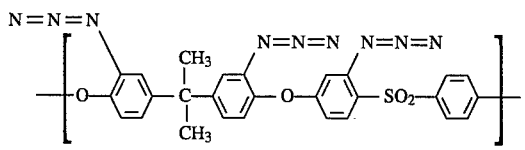

A solution of di-brominated polysulfone (4.5 g, 7.5 mmol) in THF (150 mL) was cooled to −78° C. The polymer was lithiated with n-butyllithium (2.3 mL, 23.3 mmol). The first 15 mmol n-butyllithium were added drop-wise as before to prepare dilithiated polysulfone. The polymer was further lithiated by adding the remainder of the metalating agent more rapidly. The resulting tri-lithiated polymer precipitated from solution as a thick paste. A cooled solution (−35° C.) of tosyl azide (7.4 g, 37.5 mmol) in THF (8 mL) was added rapidly to the tri-lithiated polymer. A yellow-green solution formed immediately and this mixture was stirred for 15 minutes at −78° C. The temperature of the cold bath was gradually increased over a 90 minute period to −50° C. and the creamy-yellow suspension which had formed was stirred at −50° C. for 15 minutes. The polymer was recovered by mixing the suspension with 800 mL of ethanol-water (1:1 ratio) in a Waring blender. Water was added to the resulting clear solution until a polymer precipitate formed. The product was washed and dried as before and was more photosensitive than the other polymeric azides. The pale yellow polymer contains approximately two azide groups ortho to ether and an average of 0.80 azide groups ortho to sulfone per polysulfone repeat unit. $^1$H-NMR: PSf-(2 ortho-ether-N$_3$, ortho-sulfone-N$_3$)$_{(DS=3.0)}$: In this example, U, M and D refer to the distribution of the ortho-sulfone azide, assuming there are two azide groups ortho-ether already present. i.e. U, M, D represent di-, tri- and tetra- azide repeat units respectively. δ=8.20 H-d (D), (small d); δ=8.11 H-d (M), (d); δ=7.94 H-d' (M), (d); δ=7.87 H-d (U), (d); δ=6.95–7.07 H-a,b,c',e and H-c (U) (m); δ=6.76 H-f (br. s); δ=6.65 H-c (br. d); δ=1.73 CMe$_2$ (6H s). Elemental Analysis: PSf-N$_{3(DS=3.0)}$ (C$_{27}$H$_{19}$N$_9$O$_4$S): Calc. C 57.34%, H 3.39%, N 22.29%, S 5.67%. Found C 57.65%, H 3.56%, N 21.03%, S 5.81%.

Examples 6–8 are comparative and serve to illustrate unsuccessful attempts to obtain polysulfone azides from lithiated polysulfone.

Example 6

Attempted azide formation with trimethylsilyl azide: Polysulfone (4.42 g, 0.010 mol) in dry THF (88 mL) was lithiated with n-butyllithium (1.1 mL, 0.011 mol) at −78° C., then trimethylsilylazide (TMSA, 10 mL, 0.075 mol) cooled at −50° C. was added quickly to the solution. Within a few minutes the colour changed from brown to pale green and later became cloudy white. The mixture was stirred at −78° C. for 3.5 h., then gradually warmed to −20° C. and stirred at that temperature for 30 min. The polymer was recovered by precipitation from ethanol, washed, then dried (4.7 g). The polymer contained no azide groups as shown by elemental analysis, but was substituted by trimethylsilyl groups. 1H-NMR (without TMS) δ=0.36 Me$_3$Si (9H), DS=0.67 by Me$_3$Si versus isopropylidene integration. Elemental analysis: C 70.07%; H 5.72%; N 0.00%; S 7.06%.

Example 7

Attempted azide formation with trimethylsilylmethyl azide: A THF solution of polysulfone (2.21 g, 0.005 mol) lithiated to approximately a DS of 2.0 was prepared at −78° C. To this was added a cooled (−78° C.) solution of trimethylsilylmethyl azide (2.66 g, 0.0206 tool) in THF (2.5 mL). Upon addition, a thick purple gel formed which became less viscous after gradually warming the mixture to −30° C. 1.1 g product was recovered by precipitation from ethanol. The product was not soluble in DMSO and formed a gel in chloroform, indicating some cross-linking had occurred.

Example 8

Attempted azide formation with diphenylphosphoryl azide: Polysulfone (11.06 g, 0.025 mol) in dry THF (200 mL) was lithiated with n-butyllithium (3.0 mL, 0.030 mol) to approximately a DS of 12 at −78° C., then a solution of diphenylphosphoryl azide (27.5g, 0.100 mol) in dry THF (22 mL) cooled to −78° C. was poured quickly into the solution. The viscosity of the solution immediately increased and the colour changed from brown to a green yellow and later became yellow as the viscosity decreased. The mixture was stirred at −78° C. for 2.0 h. and recovered by precipitation from ethanol, washed, then dried (16.35 g). IR showed no azide bands at ~2117 cm$^{-1}$.

Examples 9–13 serve to illustrate the substantially quantitative preparation of polysulfone amines from polysulfone azides.

Example 9

Preparation of polysulfone (ortho-sulfone) amine (DS= 2.0) composed of repeat units nominally of the structure:

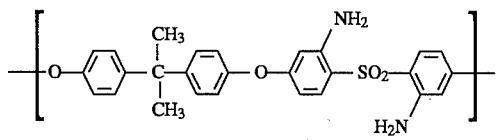

Sodium borohydride powder (18.9 g, 0.50 mol) was added quickly to a yellow solution of polysulfone (ortho-sulfone) azide (DS=2.0, 52.4 g, 0.10 mol) in THF (950 mL) and absolute ethanol (95 mL) cooled at −60° C. in a three neck flask equipped with argon inlet and a magnetic stirrer. The cooling bath was allowed to warm up to room temperature slowly, during which time gas evolution was observed. The reaction mixture was stirred for 24 h. at room temperature. Approximately half of the solvent volume was removed by vacuum distillation under reduced pressure using a warm water bath (~40° C.) and moderate vacuum. The concentrated reaction mixture was precipitated from 3 L of ethanol-water (1:1 ratio) in a Waring blender. The polymer was filtered and washed 3 times by stirring in hot water for 2 h. The polymer was filtered, then dried in a vacuum oven at 40° C. to give 44.8 g. of product (95% yield). The white product contains almost two amine groups ortho to sulfone per polysulfone repeat unit PSf-(ortho-sulfone-NH$_2$)$_{(DS=2.0)}$ (DMSO-d$_6$): δ=7.72 H-d (2H d J≈8.8); δ=7.27 H-b (4H d J≈8.7); δ=7.00 H-a (4H d J≈8.7); δ=6.26 H-e (2H d J≈2.2); δ=6.21 H-c (2H dd J≈8.8 J=2.2); δ=6.09 —NH$_2$ (4H s); δ=1.64 CMe$_2$ (6H s) . Elemental Analysis: PSf-(ortho-sulfone-NH$_2$)$_{(DS=2.0)}$ (C$_{27}$H$_{24}$N$_2$O$_4$S): Calc. C 68.63%, H 5.12% N 5.93% O 13.54%, S 6.78%, Found C 69.24%, H 5.11%, N 5.91%, S 6.60%. IR: PSf-(ortho-sulfone-NH$_2$)$_{(DS=2.0)}$: —N—H asym. str. 3474 cm$^{-1}$, —N—H sym. str. 3377 cm$^{-1}$ —N—H bending 1620 cm$^{-1}$ strong.

Example 10

Preparation of polysulfone (ortho-sulfone) amine (DS= 1.0) containing repeat units nominally of the structure:

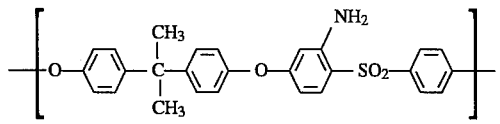

The previous procedure was repeated, but using sodium borohydride (11.3 g, 0.30 mol) and polysulfone (ortho-sulfone) azide (DS=1.0, 48.2 g, 0.10 mol) in THF (800 mL) and absolute ethanol (80 mL) The recovered polymer 43.4 g. (95% yield) contains an average of approximately one amine group ortho to sulfone per polysulfone repeat unit. PSf-(ortho-sulfone-NH$_2$)$_{(DS=1.0)}$ (DMSO-d$_6$-CDCl$_3$ 10:1, multiplet signals appear as broadened singlets): δ=7.84 H-d' (M) and H-d (U), (m); δ=7.68 H-d (D) (d); δ=7.62 H-d (M), (d); δ=7.23 H-b's (U, M, D), (m); δ=6.96 H-a's (U, M, D), (m); δ=6.27 H-e (M,D), (br.s); δ=6.21 H-c (M,D) underlying —NH$_2$; δ=6.21 —NH$_2$ (M) (br.s); δ=6.07 —NH$_2$ (D) (br.s) Elemental Analysis: PSf-(ortho-sulfone-NH$_2$)$_{(DS=1.0)}$ (C$_{27}$H$_{23}$NO$_4$S): Calc. C 70.88%, H 5.07%, N 3.06%, O 13.99%, S 7.01%. Found C 70.98%, H 5.14%, N 2.66%, S 6.45%.

Example 11

Preparation of polyarylsulfone (ortho-sulfone) amine (DS= 2.0) composed of repeat units nominally of the structure:

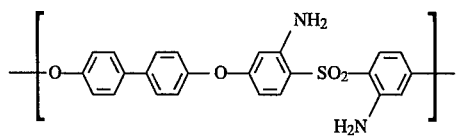

A solution of Radel R5000 polyarylsulfone diazide (0.75 g, 0.0015 mol) in NMP (7.5 mL) was slowly added by syringe into a one neck round bottom flask containing a cooled (−15° C.) suspension of sodium borohydride (0.58 g, 0.015 mol) in NMP. The mixture initially turned green, gray, then later darker red. It was stirred for 24 h. after completion of addition. The polymer was recovered from the clear red solution by precipitation into ethanol 95% and further washed 3 times by stirring for a few hours in ethanol-water solutions. The reaction mixture was stirred for 24 h. at room temperature and recovered as before to give 0.58 g. of product (90% yield). The white polymer contains an average of 2.0 amine groups per polysulfone repeat unit. Radel-PSf-(ortho-sulfone-NH$_2$)$_{(DS=2.0)}$ (DMSO-d$_6$): δ=7.76 H-d (2H d J≈8.8); δ=7.70 H-b (4H d J≈8.6); δ=7.17 H-a (4H d J≈8.6); δ=6.35–6.26 H-c and H-e (4H m); δ=6.11 —NH$_2$ (4H s) . IR: Radel-PSf-(ortho-sulfone-NH$_2$)$_{(DS=2.0)}$ —N—H asym. str. 3469 cm$^{-1}$ —N—H sym. str. 3375 cm$^{-1}$ —N—H bending 1620 cm$^{-1}$ strong.

Example 12

Preparation of polysulfone (ortho-ether) amine (DS=2.0) composed of repeat units nominally of the structure:

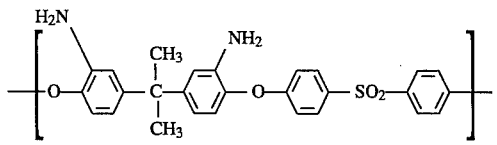

Sodium borohydride powder (18.9 g, 0.50 mol) was added quickly to a yellow solution of polysulfone (ortho-ether) azide (DS=2.0, 52.4 g, 0.10 mol) in THF (900 mL ) and absolute ethanol (90 mL) cooled at −60° C. in a three neck flask equipped with argon inlet and a magnetic stirrer. The cooling bath was allowed to room temperature slowly, during which time gas evolution was observed. The reaction mixture was stirred for 24 h. at room temperature and recovered as before to give 44.8 g. of product (95% yield). The white product contains almost two amine groups ortho to ether per polysulfone repeat unit. PSf-(ortho-ether-NH$_2$)$_{(DS=2.0)}$ (DMSO-d$_6$): δ=7.86 H-d (4H d J≈8.4); δ=6.99 H-c (4H d J≈8.4); δ=6.78 H-a or b (2H d or dd); δ=6.72 H-e (2H s); δ=6.47 H-a or b (2H d or dd); δ=4.92 —NH$_2$ (4H s); δ=1.56 CMe$_2$ (6H s). Elemental Analysis: PSf-(ortho-ether-NH$_2$)$_{(DS=2.0)}$ (C$_{27}$H$_{24}$N$_2$O$_4$S): Calc. C 68.63% H 5.12% N 5.93% O13.54% S 6.78% Found C 68.57% H 5.20%, N 5.96% S 6.71%. IR PSf-(ortho-ether-NH$_2$)$_{(DS=2.0)}$ —N—H asym. str. 3470 cm$^{-1}$, —N—H sym. str. 3375 cm$^{-1}$, —N—H bending 1621 cm$^{-1}$ strong.

Example 13

Preparation of polysulfone (ortho-ether, ortho-sulfone) amine (DS=2.75) containing repeat units nominally of the structure:

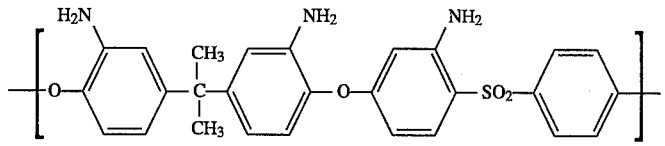

Sodium borohydride powder (1.1 g, 28.3 mmol) was added quickly to a yellow solution of polysulfone azide (DS≈2.75, 1.0 g, 1.8 mmol) in THF (18 mL) and absolute ethanol (1.8 mL) cooled at −60° C. in a three neck flask equipped with argon inlet and a magnetic stirrer. The cooling bath was allowed to warm up to room temperature slowly, during which time gas evolution was observed. The reaction mixture was stirred for 24 h. at room temperature and recovered as before to give 0.75 g. of product (90% yield). The white polymer contains an average of 2.75 amine groups per polysulfone repeat unit. $^1$H-NMR: U, M and D refer to ortho-sulfone substitution, assuming there are two functional groups ortho-ether already present, i.e. U, M, D represent di-, tri-and tetrafunctionalized repeat units respectively. PSf-(ortho-ether, ortho-sulfone-NH$_2$)$_{(DS=3.0)}$ (DMSO-d$_6$): δ=7.81–7.90 H-d (U) , and H-d' (M), (m); δ=7.66 H-d (D), (small d); δ=61 H-d (M), (d); δ=6.92–7.02 H-c (U), (m); δ=6.65–6.84 H-a or b and H-f (m); δ=6.46 H-a or H-b (br.s); δ=6.00–6.28 H-c and H-e (M,D) and —NH$_2$ (M, D), (m); δ=4.91 and δ=4.82 ortho-ether-NH$_2$ (two singlets arising from amine being adjacent to an aromatic ring containing either an amine or no amine); δ=1.55 CMe$_2$ (6H s). Elemental Analysis: PSf-(ortho-ether, ortho-sulfone-NH$_2$)$_{(DS=3.0)}$ (C$_{27}$H$_{25}$N$_3$O$_4$S): Calc. C 66.51%, H 5.17%, N 8.62%, S 6.58%. Found C 66.37%, H 5.04%, N 8.40%, S 6.52%. IR: PSf-(ortho-ether, ortho-sulfone-NH$_2$)$_{(DS=3.0)}$ —N—H asym. str. 3470 cm$^{-1}$, —N—H sym. str. 3375 cm$^{-1}$, —N—H bending 1620 cm$^{-1}$ strong.

Example 14 is comparative and serves to illustrate an unsuccessful attempt for the substantially quantitative preparation of polysulfone amines from polysulfone.

Example 14

Partial amination of lithiated polymer with lithium methoxylamide A THF solution of polysulfone (2.21 g, 0.005 mol) lithiated to approximately DS of 1.2 was prepared at −78° C. To this was added a solution of lithium methoxylamide (0.040 mol) at −78° C., previously prepared by adding methoxyamine (1.88 g, 0.040 mol) slowly to methyllithium (34.2 mL of 1.4M solution in diethyl ether, 0.048 mol) at −78° C. The polymer precipitated immediately, but within one minute changed to a creamy yellow solution. The mixture was stirred at −78° C. for 2.5 h., then gradually warmed to −20° C. and stirred at that temperature for 1 h. The polymer was recovered by precipitation from ethanol, washed, then dried (1.20 g). The product formed a gel in DMSO and was almost completely soluble in chloroform. A $^1$H-NMR spectrum in CDCl$_3$ showed the presence of a small amount of ortho-sulfone amine substituted polysulfone (DS≈0.20).

Example 15 serves to illustrate that polymeric azides can be fabricated into films and the said films crosslinked by heat treatment or radiation.

Example 15

A 10% solution of polysulfone (ortho-sulfone) azide (DS= 2.0) in chloroform and a 10% solution of polysulfone (ortho-ether) azide (DS=2.0) in chloroform were cast onto glass plates with a casting blade having a gap width of 10 thou. The solutions were allowed to evaporate at ambient temperature and at atmospheric pressure. The clear films were floated off the glass plates by immersing them in water. Residual solvent was removed from the clear films using a vacuum oven at room temperature. The films were crosslinked by exposure to long UV or by placing the films in an oven at 100° C., Increasing the temperature to 160° C. then removing after 15 minutes. The crosslinked films were darker in color to the original films, especially the polysulfone (ortho-ether) azide which went dark brown. The solvent resistance of the films were determined by placing the films in a variety of solvents of various polarities including chloroform, THF, dimethylformamide, dimethylacetamide and N-methyl- 2-pyrrolidinone. The UV cured films were partly soluble. The thermally cured films were insoluble in all solvents tested for a one month period.

Examples 16–21 serve to illustrate the preparation of substituted polysulfone triazoles from polysulfone azides by 1,3 cycloaddition reactions. Polysulfone (ortho-sulfone) azide (D.S.=2.0) and polysulfone (ortho-ether) azide (D.S.= 2.0) were reacted with a variety of acetylene reagents (R$_1$-C≡C-R$_2$) to give the following polymers bearing triazoline rings:

Example 16

Preparation of polysulfone (ortho-ether) methylester triazole (DS=2.0) containing repeat units nominally of the structure:

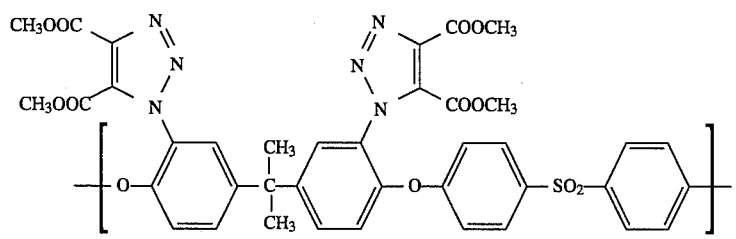

Polysulfone (ortho-ether) diazide (5.25g, 0.010 mol) was dissolved in distilled DMF (52.5 mL) and heated to about 45° C. Dimethyl acetylenedicarboxylate ($CH_3OOC—C≡C—COOCH_3$, 4.93 mL, 0.040 mol) was added in one lot to the yellow polymer solution. The resulting mixture was heated at 105° C. for 24 hrs. The polymer was recovered by precipitation from 95% ethanol. $^1$H NMR ($CDCl_3$): δ=7.80 (d); δ=7.56 (d); δ=7.40 (dd); δ=7.04 (d); δ=6.97 (d); δ=3.95 (s); δ=3.75 (s); δ=1.90–1.65 (m).

Example 17

Preparation of polysulfone (ortho-sulfone) methylester triazole (DS=2.0) containing repeat units nominally of the structure:

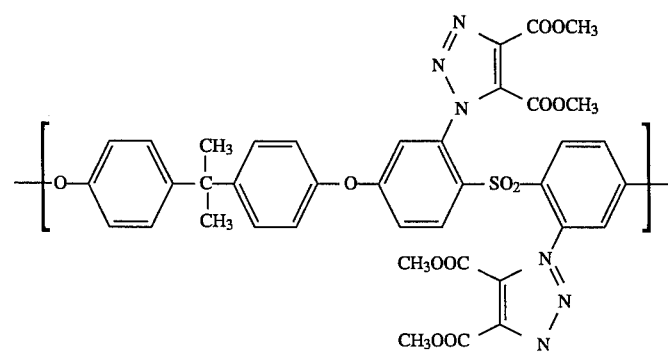

The experimental conditions were similar to those of Example 16, but using polysulfone (ortho-sulfone) diazide (5.25 g, 0.010 mol) and dimethyl acetylenedicarboxylate (7.39 mL, 0.060 mol), and heating at 105° C. for 5 days. $^1$H NMR ($CDCl_3$): δ=7.35–7.25 (m); δ=7.12 (dd); δ=7.07 (d); δ=6.95 (d); δ=3.99 (s); δ=3.82 (s); δ=1.80–1.60 (m).

Example 18

Preparation of polysulfone (ortho-ether) trimethylsilyl triazole (DS=2.0) containing repeat units nominally of the structure:

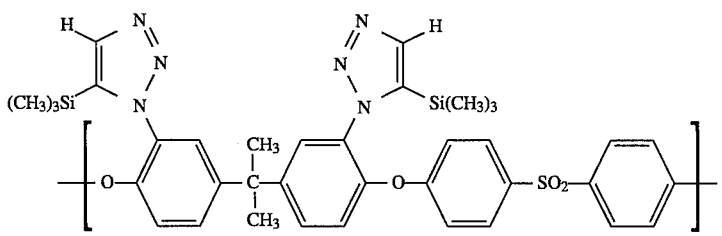

The experimental conditions were similar to those of Example 16, but using trimethylsilylacetylene (HC≡C—Si($CH_3$)$_3$, 9.91 mL, 0.070 mol), and heating at 105° C. for 2 days. $^1$H NMR ($CDCl_3$): δ=7.90 (s); δ=7.80 (d); δ=7.73 (d); δ=7.33 (dd); δ=7.06 (d); δ=6.98 (d); δ=6.98 (d); δ=1.80–1.70 (m); δ=0.25 (s).

Example 19

Preparation of polysulfone (ortho-ether) triazole (DS=2.0) containing repeat units nominally of the structure:

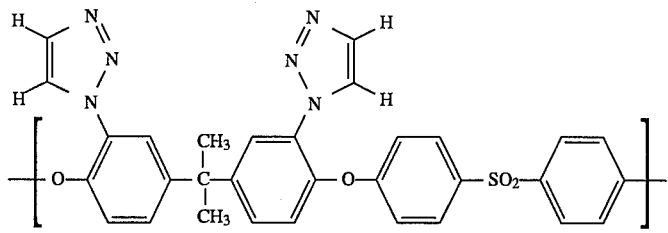

The experimental conditions were similar to those of Example 16, but using acetylene dicarboxylic acid (HOOC—C≡C—COOH, 4.57g, 0.040 mol) and heating at 130° C. for 2 days. An intermediate dicarboxylic acid triazole formed which underwent decarboxylation during heating the reaction. The polymer was recovered by precipitation from isopropanol. $^1$H NMR (DMSO-$d_6$): δ=8.47 (s); δ=7.90–7.80 (m); δ=7.74 (d); δ=7.49 (dd); δ=7.29 (d); δ=7.11 (d); δ=1.76 (s).

Example 20

Preparation of polysulfone (ortho-ether) triazole carbinol (DS=2.0) containing repeat units nominally of the structure:

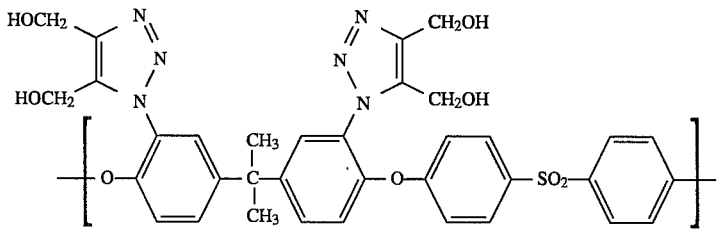

The experimental conditions were similar to those of Example 16, but using a solution of 2-butyne-1,4 diol (HOCH$_2$—C≡C—CH$_2$OH, 3.45g, 0.040 mol) in DMF (3.5 mL) added dropwise. The mixture was heated at 110° C. for 4 days and recovered by precipitation from isopropanol. $^1$H NMR (DMSO-$d_6$): δ=7.87 (d); δ=7.59 (d); δ=7.50 (dd); δ=7.27 (d); δ=7.10 (d); δ=5.25 (t); δ=5.13 (t); δ=4.53 (d); δ=4.46 (d); δ=1.75 (s).

Example 21

Preparation of polysulfone (ortho-sulfone) triazole carbinol (DS=2.0) containing repeat units nominally of the structure:

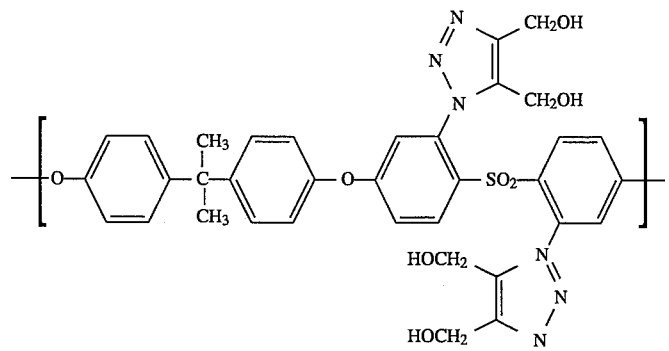

The experimental conditions were similar to those of Example 19, but using polysulfone (ortho-sulfone) diazide (5.25 g, 0.010 mol), and heating the mixture at 110° C. for 6 days. $^1$H NMR (DMSO-$d_6$): δ=7.40–7.25 (m); δ=7.20–7.00 (m); δ=5.25–5.10 (m); δ=4.62–4.50 (m); δ=4.40–4.20 (m); δ=1.68 (s).

Example 22 is comparative and serves to illustrate the lithiation and formation of an azide derivative of poly(2,6-dimethylphenylene oxide), an aromatic polymer other than polysulfone.

Example 22

Preparation of poly(2,6-dimethylphenylene oxide) (PPO) azide from lithiated PPO and tosyl azide: A dilute suspension of PPO (6.0 g) in THF (110 mL) was cooled to −10° C. and PPO was lithiated slowly using n-butyllithium (2.5 mL, 0.025 mol). The resulting reaction mixture was cooled to −60° C. and stirred for 15 min. A solution of tosyl azide (2.5 mL, 0.025 tool) was cooled to −35° C. and poured promptly into the reaction flask. The temperature was gradually brought up to −50° C. and stirred for one hour at that temperature. The polymer was recovered by precipitation from ethanol water (3:1), washed and dried. The resulting yellow polymer was not soluble in DMF, NMP, THF solvents and gelled in chloroform. In the IR spectrum, a characteristic absorption band at 2114 cm$^{-1}$ indicated the presence of an azide substitution on the polymer.

STRUCTURAL CHARACTERIZATION OF AZIDE-SUBSTITUTED POLYSULFONES

$^1$H-NMR

Figure 5A:
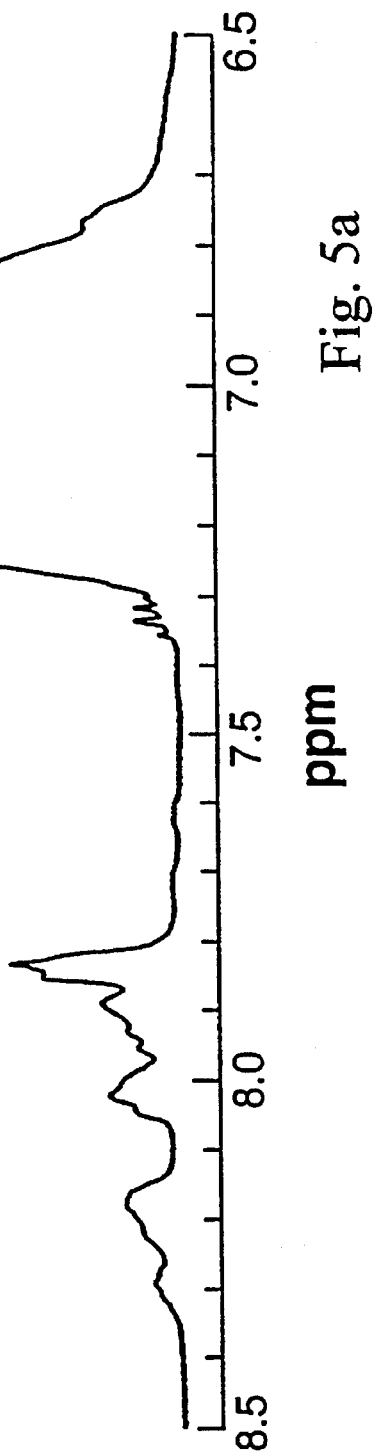
FIG. 5a illustrates the $^1$H-NMR spectrum of diphenylphosphoryltriazene substituted polysulfone from the reaction with DPPA.
Figure 5B:
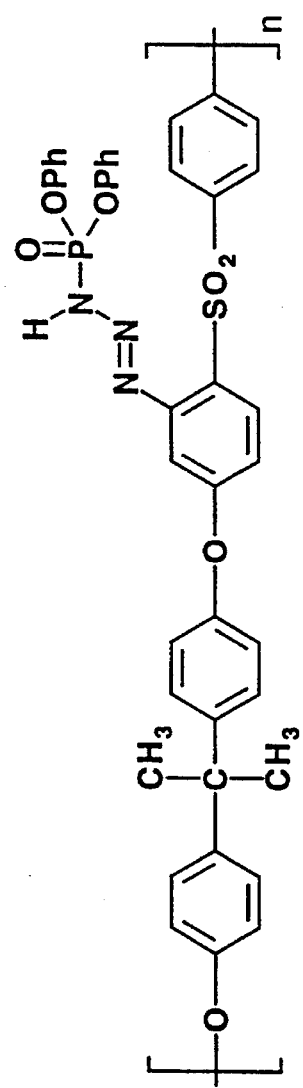
FIG. 5b illustrates the structure of diphenylphosphoryltriazene substitute polysulfone from reaction with DPPA.

The diphenylphosphoryltriazene substituted polysulfone from the reaction with Diphenylphosphoryl azide (DPPA) gave a complicated spectrum as shown in FIG. 5. Proton signals additional to the one at δ=7.85 in the deshielded orthosulfone region indicates substitution of functionality at that site. In addition, a large multipier in the phenyl region is consistent with the presence of the diphenylphosphoryl residue.

By contrast, the spectrum of polysulfone diazide 3 is simple and unambiguous (FIG. 6a), resembling a homopolymer. The bisphenol protons H-a and H-b are little changed from the unmodified polymer. Protons H-c give a doublet of doublets, being both ortho-coupled (J≈8.8) to the deshielded H-d protons (2H) and meta-coupled (J≈2.1) to the H-e protons (2H). The H-d signal from unmodified polymer is completely absent.

The polyarylsulfone diazide (4c) spectrum (FIG. 6b) is very similar to that of 3, indicating that virtually every repeat unit consists of the structure shown. Spectra of polysulfone azides with DS<2 are more complicated because of the presence of un-substituted, mono-substituted and disubstituted repeat units. These three types of units are distinguished by the deshielded H-d protons in the polysulfone azide DS=1 derivative. Un-substituted and disubstituted repeat units each have 4H doublets at δ=7.85 and δ=8.20 respectively. The mono-substituted units have two doublets: a 1H doublet at δ=8.10 arising from the ortho-sulfone proton on the phenyl azide and a 2H doublet at δ=7.92 from the ortho-sulfone protons on the phenyl without the azide.

The ortho-ether polysulfone azide 7 was obtained from dibrominated polymer 5. The spectrum of 5 has been described elsewhere. The spectrum of 7 (FIG. 7a) is distinctly different from that of 3, having a 4H doublet arising from ortho-sulfone protons, and a broad multiplet, encompassing all the other proton signals. Only a trace amount of ortho-sulfone azide is apparent from the minor doublet at δ=7.92. A characteristic δ=7.52 H-e doublet of the brominated starting material 5 is entirely absent and the equivalent H-e in 7 is shifted upfield, presumably due to the shielding effect of the azide group.

A spectrum of triazide 8b (actual DS=2.75 by NMR) has four ortho-sulfone doublet signals (FIG. 7b). A 4H doublet H-d at δ=7.87, which is much reduced from that in spectrum 7, corresponds to repeat units 7. A 2H doublet at δ=7.94 and a 1H doublet at δ=8.11 correspond to repeat unit 8b where the protons are in two different environments. A small 4H doublet at δ=8.20 is assigned to ortho-sulfone protons of a tetra-substituted azide repeat unit. Two other signals of note are a meta-coupled doublet at δ=6.76 and a broadened doublet at δ=6.65.

$^{13}$C-NMR

Figure 8A:
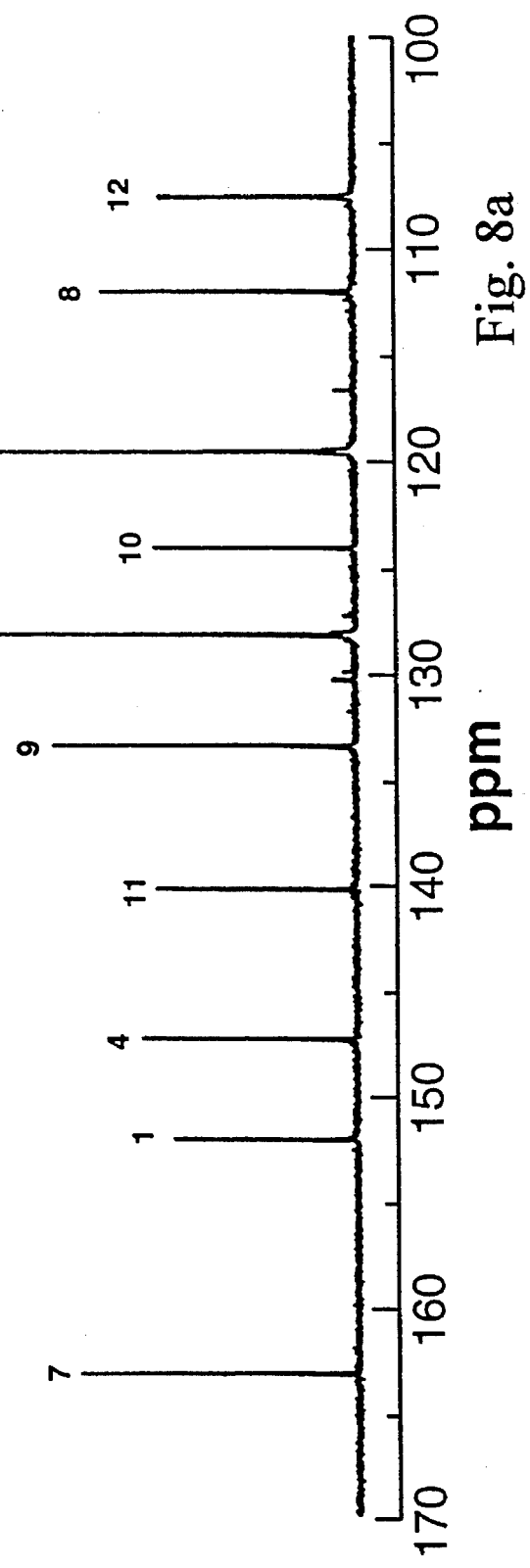
FIG. 8a illustrates $^{13}$C-NMR (aromatic region) and chemical shift assignments of polysulfone ortho-sulfone azide derivative 3.
Figure 8B:
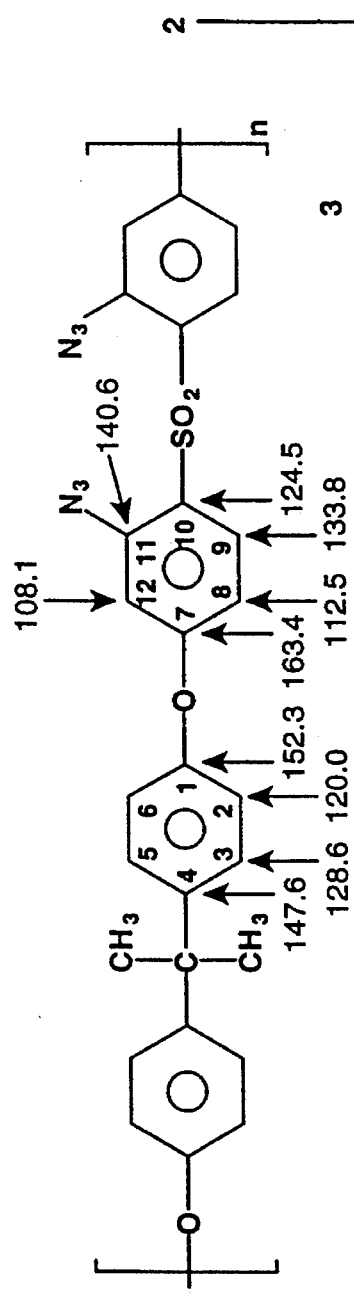
FIG. 8b illustrates the chemical shift assignments of structure of the compound 3.
Figure 9B:
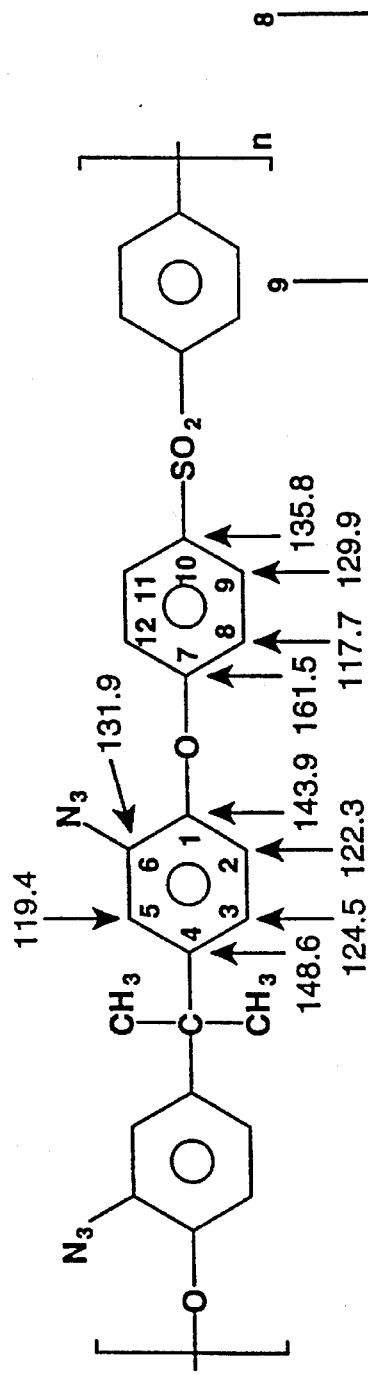
FIG. 9b illustrates the chemical shift assignments of the structure of the compound 7.
Figure 9A:
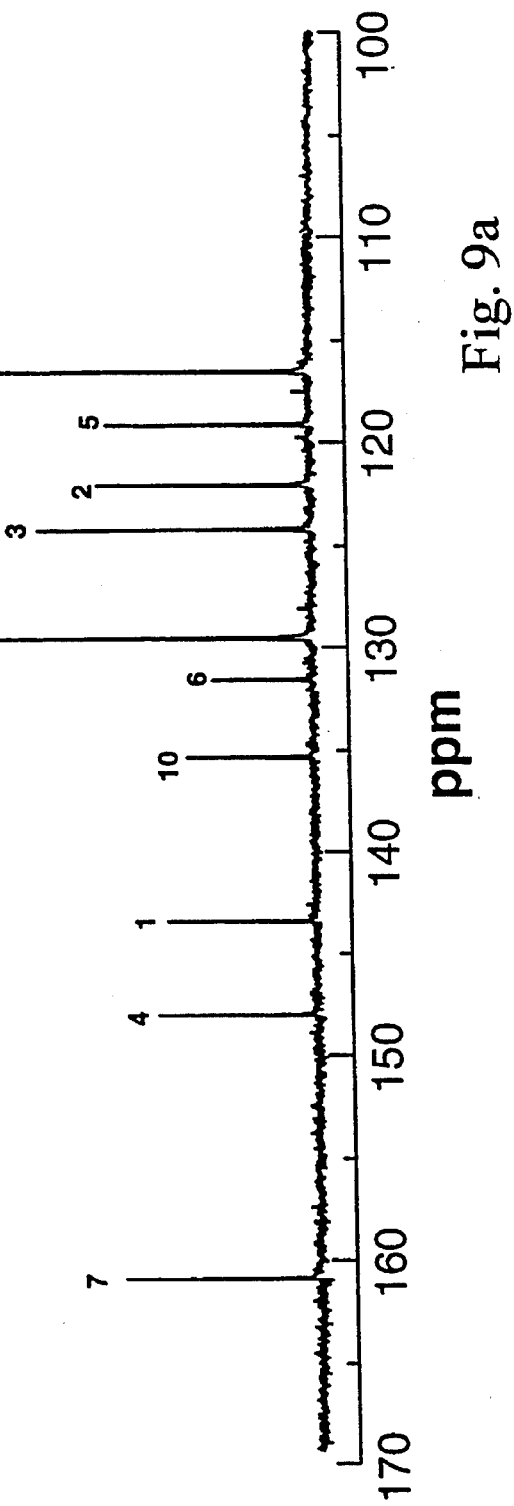
FIG. 9a illustrates $^{13}$C-NMR (aromatic region) and chemical shift assignments of polysulfone ortho-ether azide derivative 7.

FIGS. 8 and 9 show the respective $^{13}$C-NMR spectra (aromatic region) of polysulfone azide 3 and 7 along with the assigned chemical shifts. The combination of one-bond (HETCOR) and three-bond long-range 2D heteronuclear correlation (LRHETCOR) techniques allowed full unambiguous assignment of $^1$H and $^{13}$C-NMR spectra. For azide 7, the methyl resonance shows long-range correlations to two quaternary carbons, one being the methyl bearing carbon and the other identified to be C-4. C-4 shows the expected correlation to H-2 which exhibits the three bond coupling to C-6. C-2 was identified by the absence of any 7.5 Hz long-range couplings and the doublet structure within the proton spectrum. H-5 exhibits a long-range coupling to C-3. C-1 shows three-bond couplings, as expected, to both H-5 and H-3. The single quaternary carbon at low-field, 161.5 ppm, exhibits the characteristic shift for a carbon adjacent to the oxygen in a polysulfone. Using this as a starting point and utilizing long-range 7.5 Hz long-range correlations and direct one-bond correlations, the remainder of the second aromatic ring may be readily assigned. Using similar techniques for azide 3, assignments were also made unambiguously.

Infrared

Figures 10A, 10B, 10C:
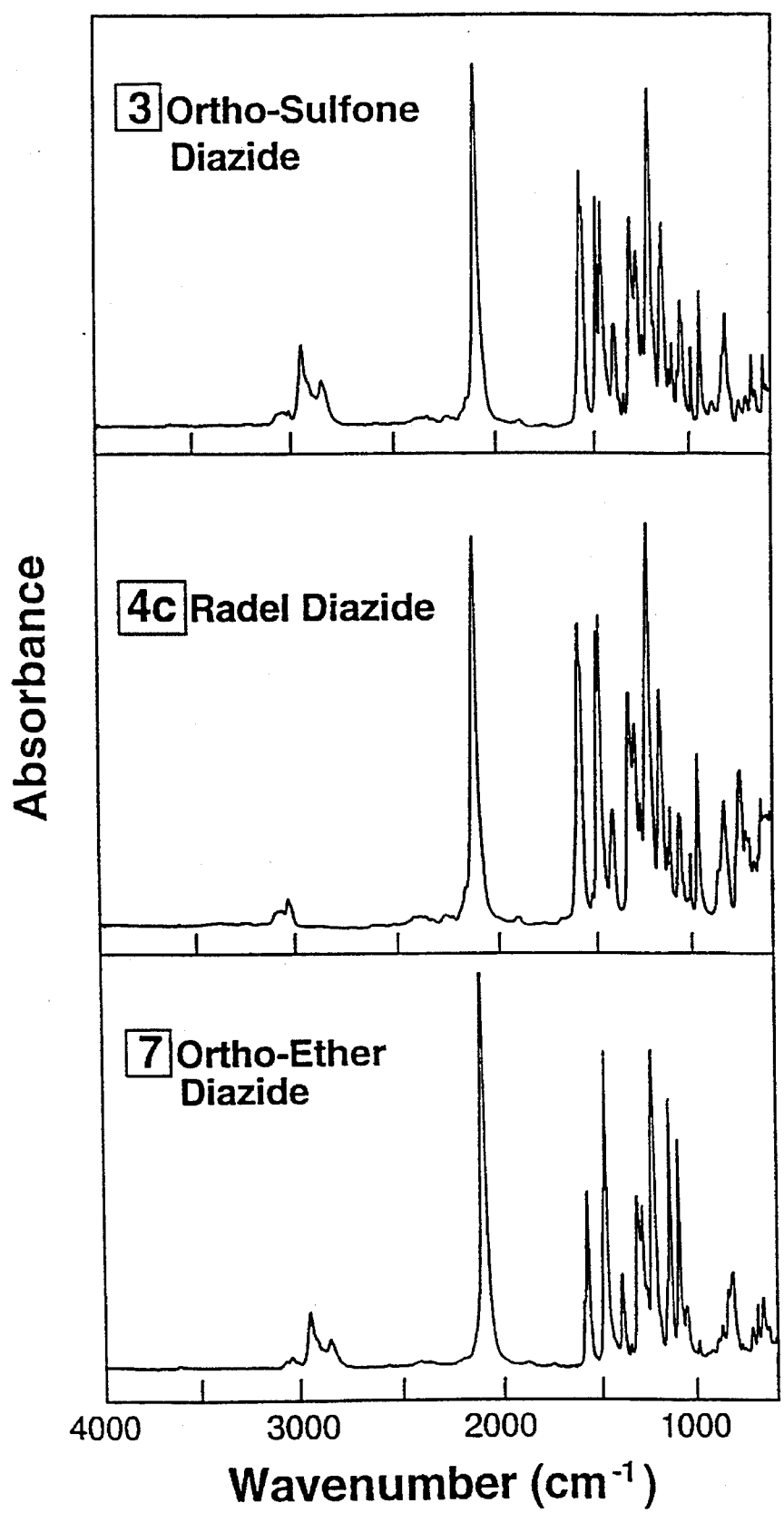
FIGS. 10a, 10b and 10c illustrate FTIR spectra of three diazide derivatives 3, 4c and 7.

The FTIR spectra of three diazide derivatives 3, 4c and 7 are shown in FIG. 10. Azides give characteristic strong IR absorptions arising from asymmetric —N=N=N stretching. In the spectrum of each polymer, the azide band was the strongest absorption at 2118 cm$^{-1}$, 2117 cm$^{-1}$ and 2116 cm$^{-1}$ respectively.

Gel Permeation Chromatography

Figures 11A, 11B:
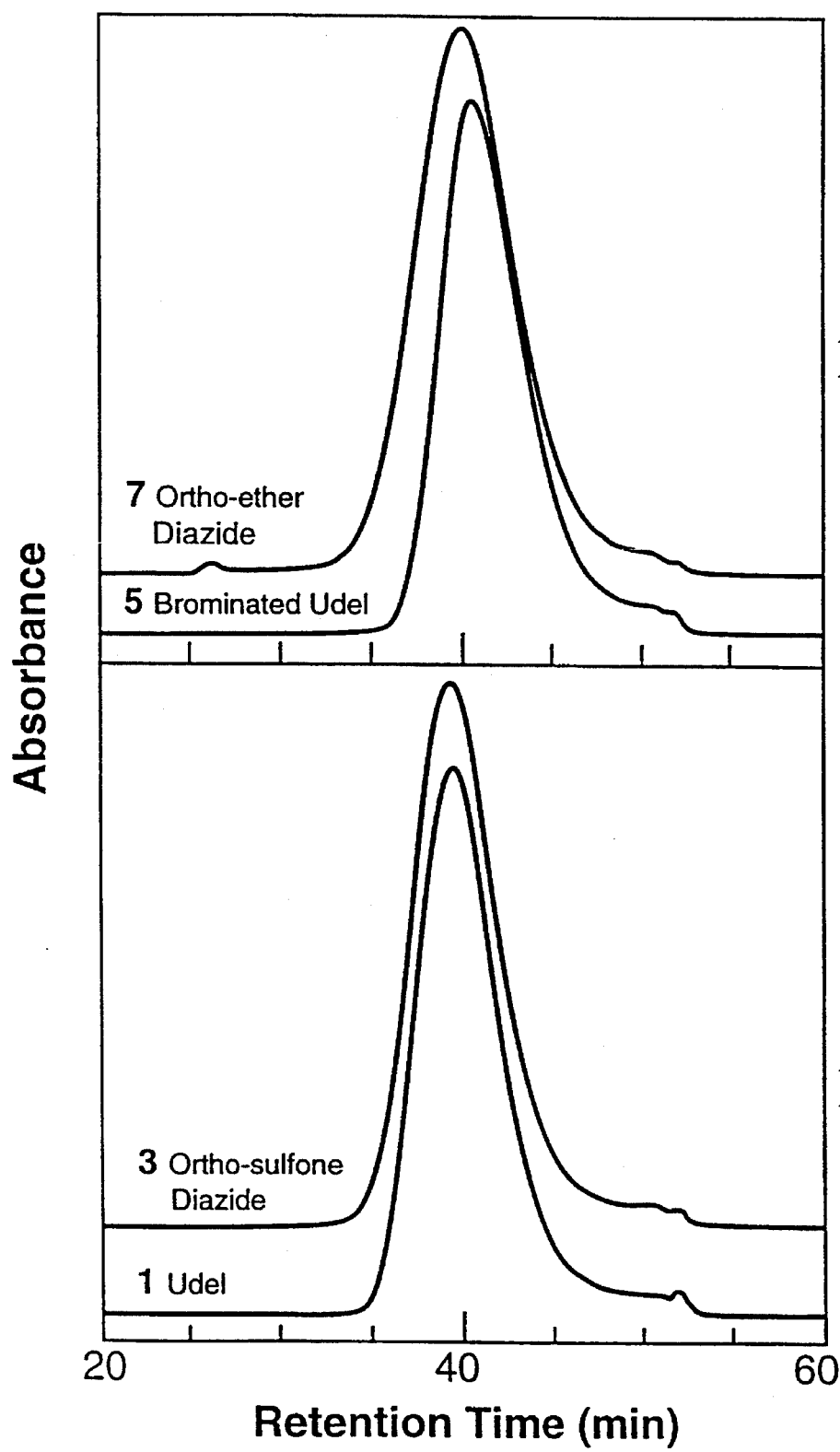
FIGS. 11a and 11b illustrate GPC profiles of Udel 1 and di-brominated Udel 5 compared with diazides 3, and 7.

The effect of ortho-sulfone and ortho-ether modification chemistry on molecular weight distribution was determined by GPC. FIG. 11 shows the GPC profiles of starting materials Udel 1 and di-brominated Udel 5 compared with those of diazides 3 and 7. Ortho-sulfone diazide 3 had a virtually identical profile to that of the starting material, showing that no changes in molecular weight distribution had occurred. In the case of the ortho-ether diazide 7 there was a slight broadening of the peak, with the polydispersity increasing from 3.5 to 5.0. A minor amount of higher molecular weight polymer was evident from the slight tail before the main sample eluted. The slight change in molecular weight distribution had no apparent effect on the solubility. Radel R 4a and diazide 4c were not measured because of insolubility in THF. However, a soluble amine derived from the reduced azide had a molecular weight profile similar to that of Udel[23].

Thermogravimetric Analysis

Figure 12:
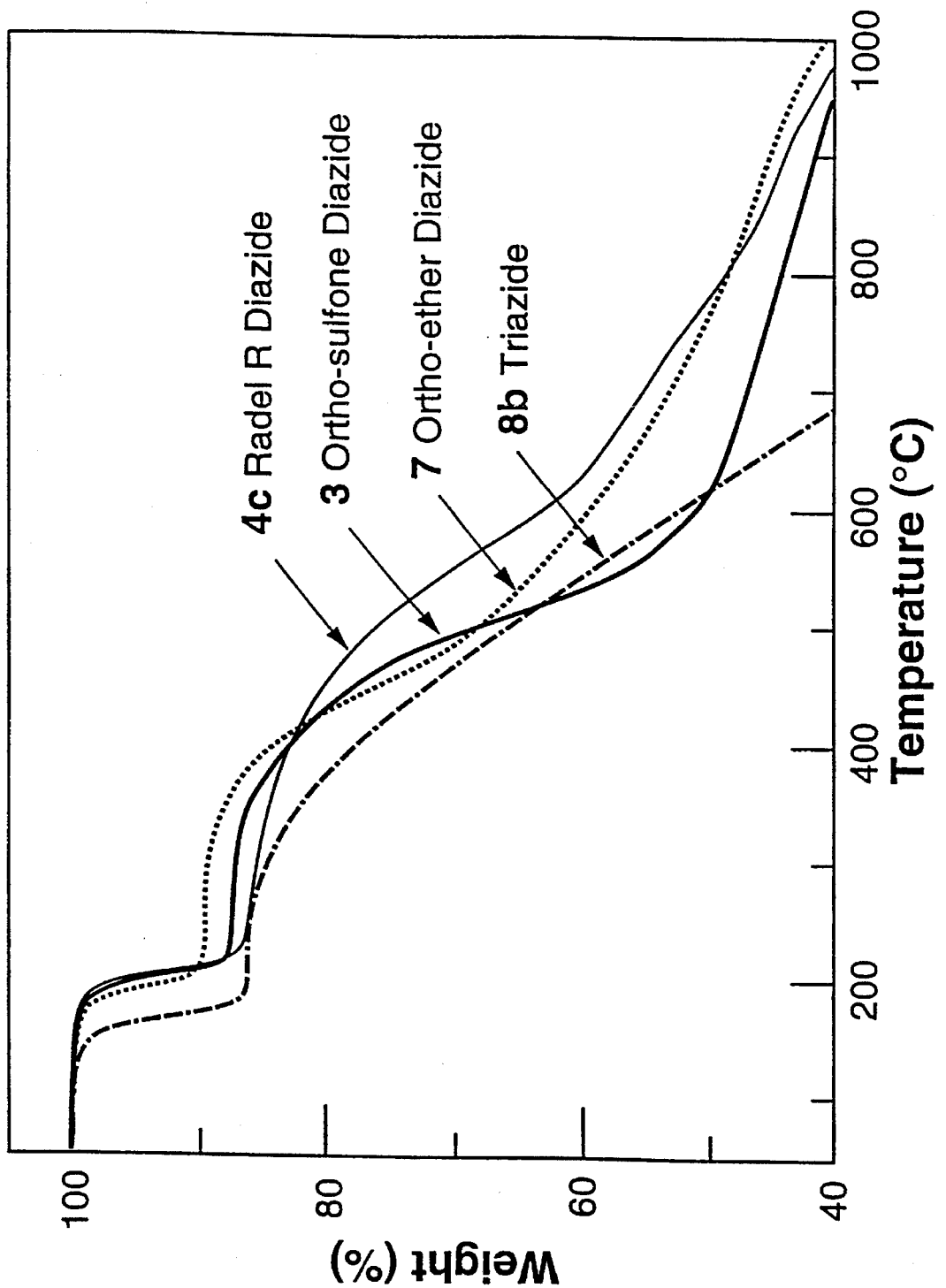
FIG. 12 illustrates TGA curves of diazides 3, 4c, 7 and triazide 8b.

Organic azides are well known to be thermally unstable. The initial thermal degradation product is generally a reactive intermediate nitrene arising from the loss of $N_2$. The diazide polymers exhibited similar profiles for two stage decomposition as shown in FIG. 12. Both initial extrapolated onsets for ortho-sulfone diazide 3 and 4c occurred at 184° C. A theoretical weight loss of 10.7% and 11.6% is expected for the loss of two molecules of nitrogen from a diazide of structure 3 or 7. and 4c respectively. The experimental weight loss for ortho-sulfone azides 3 and 4c was 12.4% and 13.9% respectively, higher than the expected —$2N_2$ loss, suggesting additional degradation pathways. This anomalous higher weight loss was also observed for ortho-sulfone azide with DS=1. For ortho-ether diazide 7, initial extrapolated onset occurred at 176° C. with a weight loss of 10.5%, close to the theoretical value for the expected degradation. For triazide polymer 8b, the initial extrapolated onset occurred at 148° C. with a weight loss of 13.8%. A polymer composed completely of repeat units 8b would give an expected weight loss of 14.8% for $3N_2$. Experimentally, 8b had a DS=2.75 by $^1$H-NMR and a DS=2.83 by elemental analysis. Assuming the loss only of $N^2$ from each azide group, the DS of 8b from the TGA decomposition is 2.80.

STRUCTURAL CHARACTERIZATION OF AMINE-SUBSTITUTED POLYSULFONES

Figure 13B:
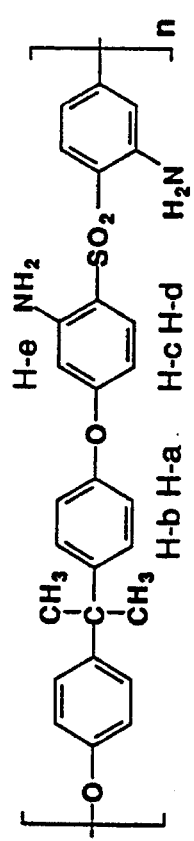
FIG. 13b illustrates the signal assignments of the structure of a polysulfone containing two ortho-to-sulfone amine groups per repeat unit.
Figure 13A:
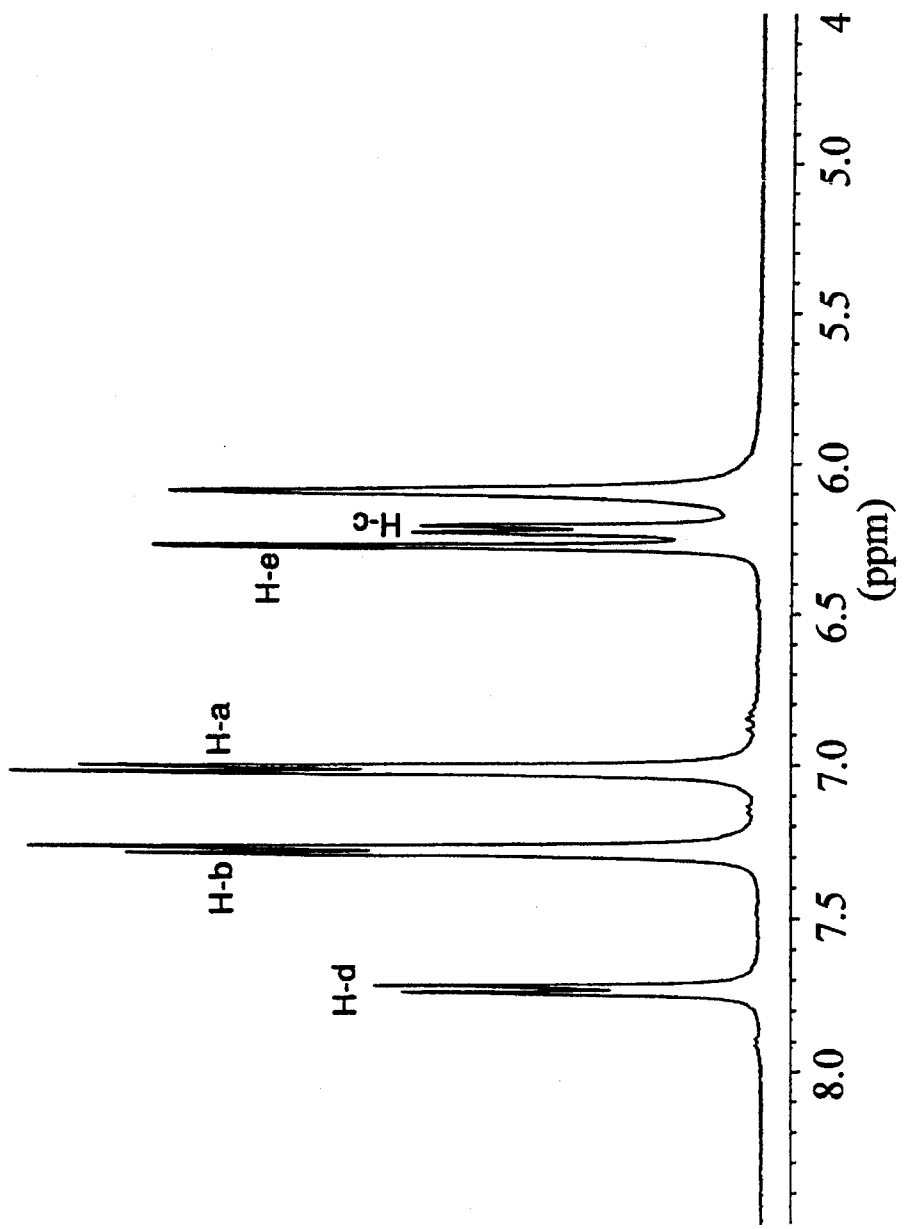
FIG. 13a illustrates a partial $^1$H-NMR spectrum of polysulfone containing two ortho-to-sulfone amine groups per repeat unit and showing the signal assignments.
Figure 14B:
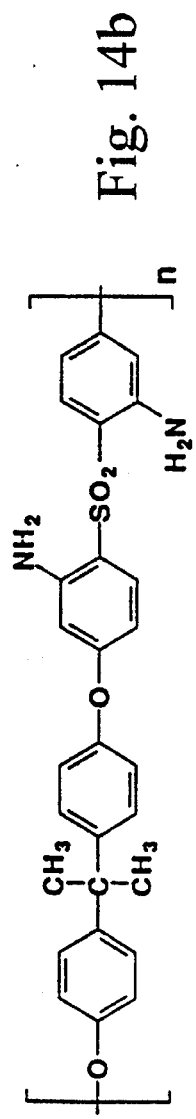
FIG. 14b illustrates the structure of a polysulfone containing two ortho-to-sulfone amine groups per repeat unit.
Figure 14A:
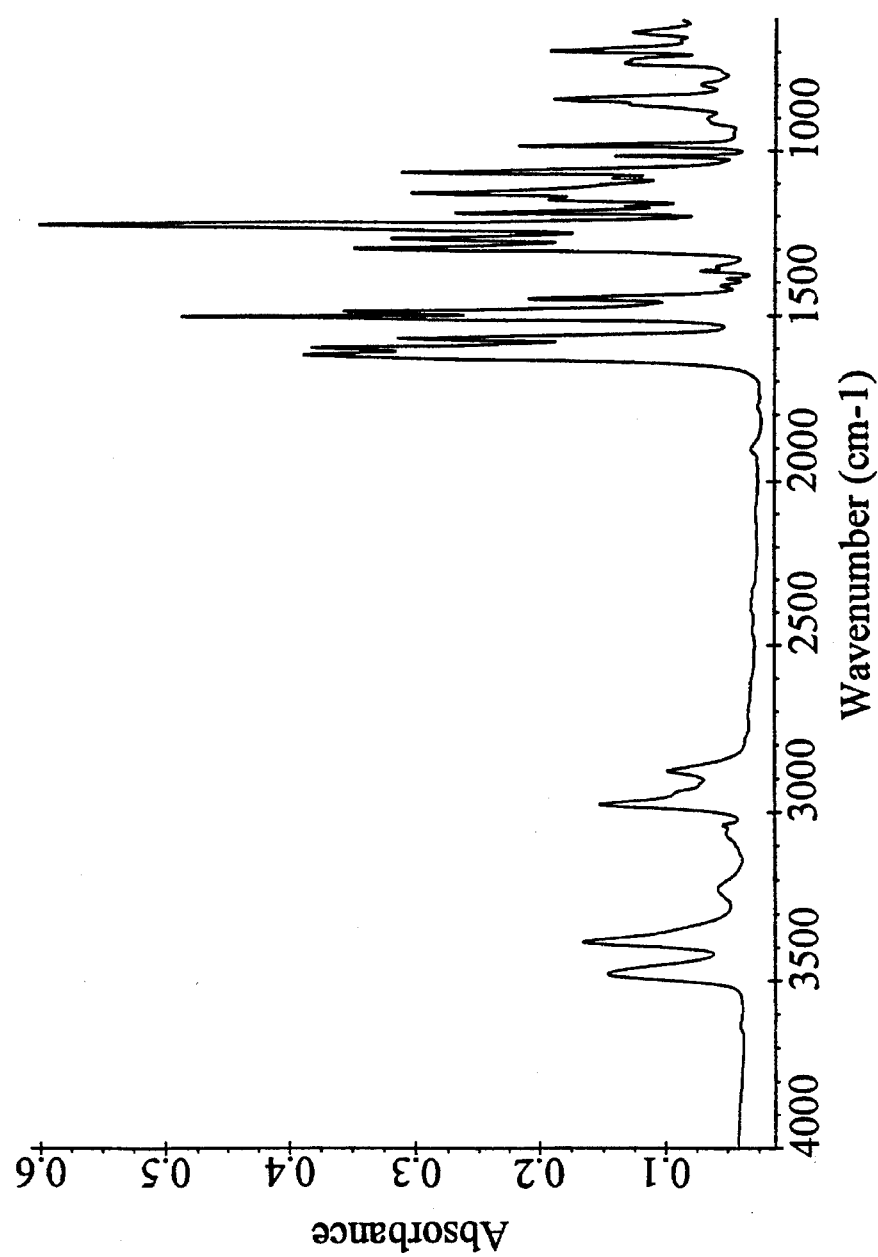
FIG. 14a illustrates an infrared spectrum of polysulfone containing two ortho-to-sulfone amine groups per repeat unit.

Polysulfone diazide 3 was reduced substantially quantitatively to a diamine using sodium borohydride. FIG. 13 illustrates a partial proton NMR spectrum of polysulfone containing two ortho-to-sulfone amine groups per repeat unit and showing the signal assignments. The spectrum is simple and unambiguous indicating a homopolymer type aminated polymer with no residual azide signals present. The spectrum of the unsubstituted bisphenol portion consists of a pair of coupled 4H doublets at $\delta=7.27$ H-b and $\delta=7.00$ H-a. The spectrum of the azide-substituted diphenylsulfone portion consists of a downfield 2H doublet at $\delta=7.72$ H-d coupled to a 2H doublet at $\delta=6.21$ H-c. The signal at $\delta=6.26$ H-e corresponds to the aromatic proton ortho to the amine group. The singlet at $\delta=6.09$ corresponds to the primary amine protons. FIG. 14 illustrates the infrared spectrum of polysulfone containing two ortho-to-sulfone amine groups per repeat unit and shows the complete absence of the strong azide absorption at 2118 $cm^{-1}$. Absorptions at 3474 $cm^{-1}$ (—N—H asymmetric stretch), at 3377 $cm^{-1}$ (—N—H symmetric stretch) and at 1620 $cm^{-1}$ (—N—H bending) confirm the presence of primary amine groups.

Figure 15B:
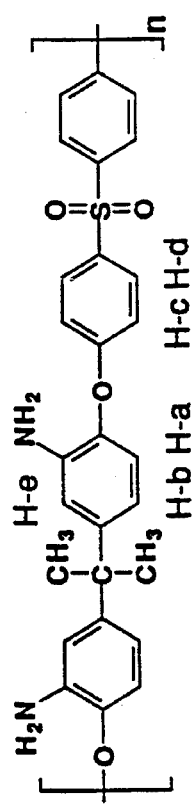
FIG. 15b illustrates the signal assignments of the structure of a polysulfone containing two ortho-to-ether amine groups per repeat unit.
Figure 15A:
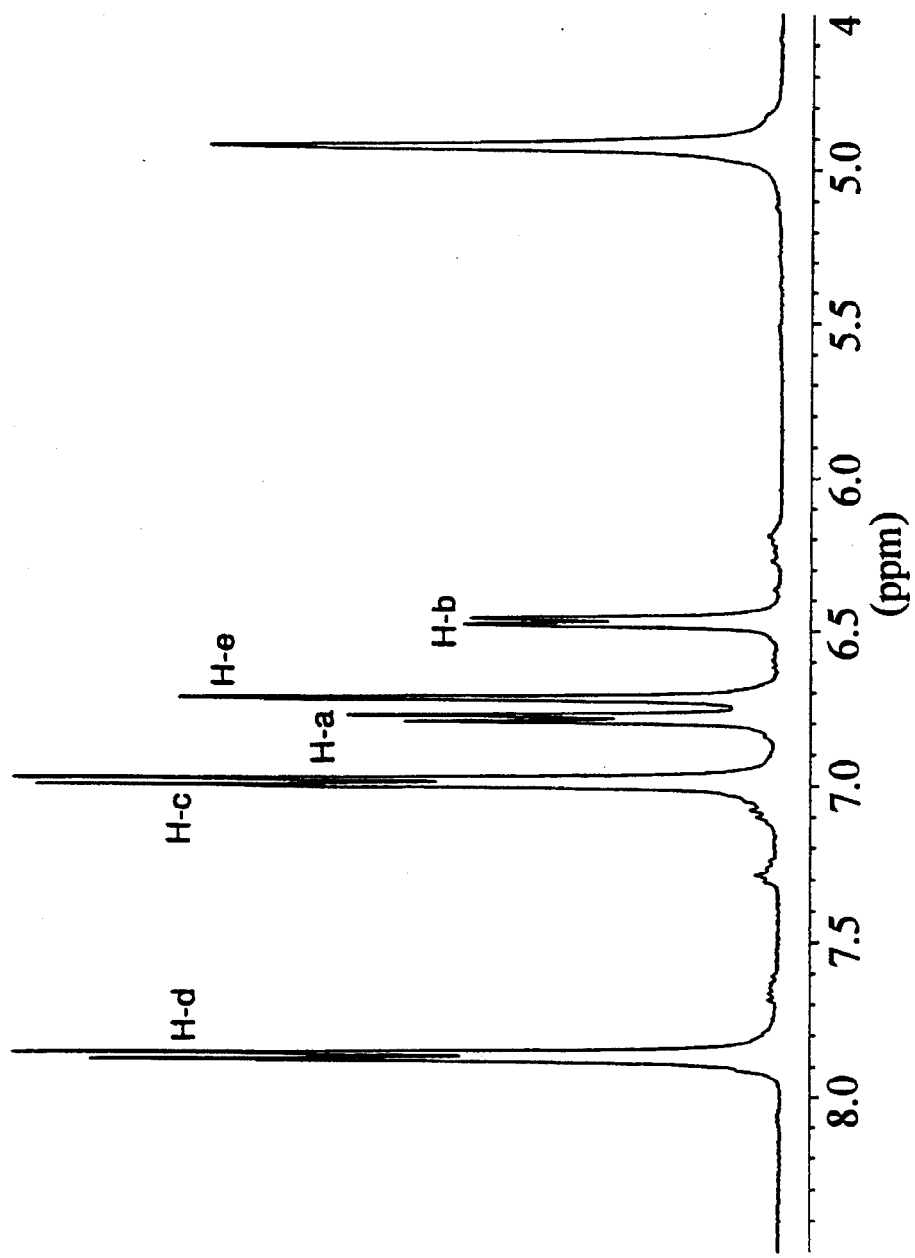
FIG. 15a illustrates a partial $^1$H-NMR spectrum of polysulfone containing two ortho-to-ether amine groups per repeat unit and showing the signal assignments.
Figure 16B:
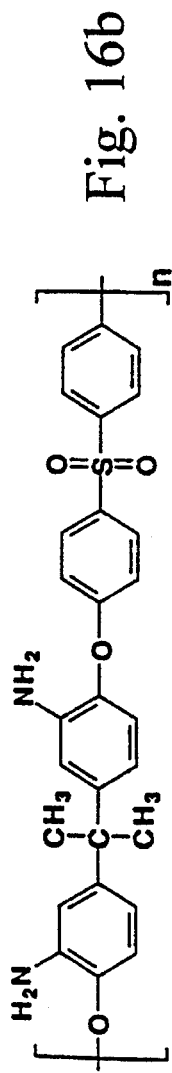
FIG. 16b illustrates the structure of a polysulfone containing two ortho-to-ether amine groups per repeat unit.
Figure 16A:
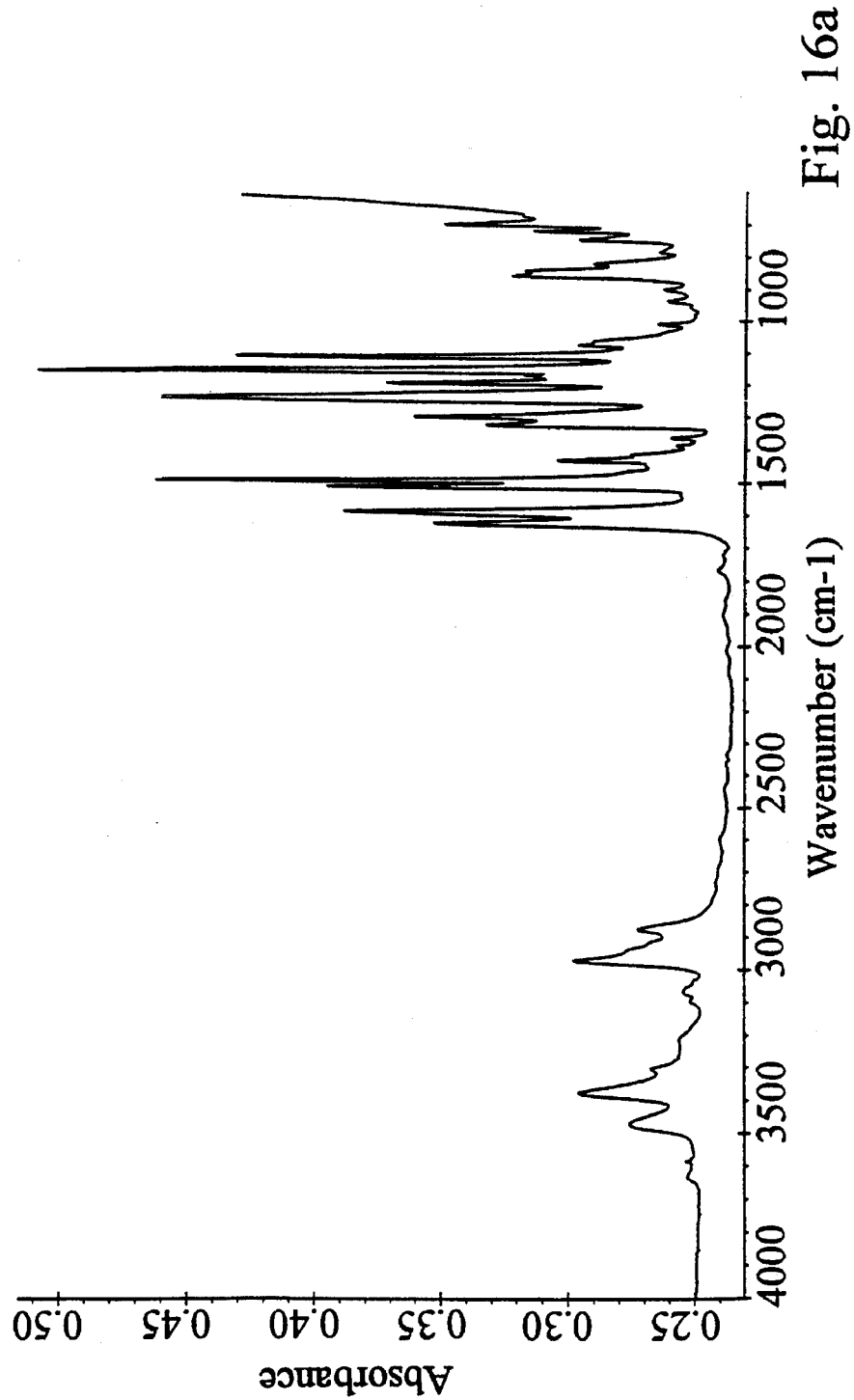
FIG. 16a shows an infrared spectrum of polysulfone containing two ortho-to-ether amine groups per repeat unit.

Polysulfone diazide 7 was reduced also substantially quantitatively to a diamine using sodium borohydride. FIG. 15 illustrates a partial proton NMR spectrum of polysulfone containing two ortho-to-ether amine groups per repeat unit and showing the signal assignments. The spectrum is simple and unambiguous indicating a homopolymer type aminated polymer with no residual azide signals present. The spectrum of the unsubstituted diphenylsulfone portion consists of a spectrum of the azide-substituted bisphenol portion consists of a 2H doublet at $\delta=6.78$ H-a coupled to a 2H doublet at $\delta=6.47$ H-b. The signal at $\delta=6.72$ H-e corresponds to the aromatic proton ortho to the-amine group. The singlet at $\delta=4.92$ corresponds to the primary amine protons. FIG. 16 illustrates the infrared spectrum of polysulfone containing two ortho-to-ether amine groups per repeat unit and shows the complete absence of the strong azide absorption at 2117 $cm^{-1}$. Absorptions at 3470 $cm^{-1}$ (—N—H asymmetric stretch), at 3375 $cm^{-1}$ (—N—H symmetric stretch) and at 1621 $cm^{-1}$ (—N—H bending) confirm the presence of primary amine groups.

We claim:

1. An azide-substituted polysulfone polymer selected from the group consisting of:

A) an azide substituted bisphenol polysulfone containing a polymer repeat unit of formula (I):

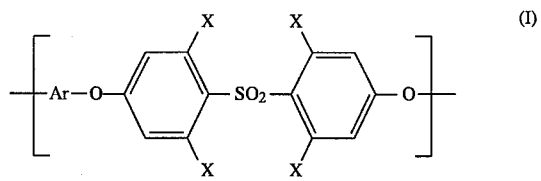

wherein Ar is an aromatic radical selected from the group consisting of:

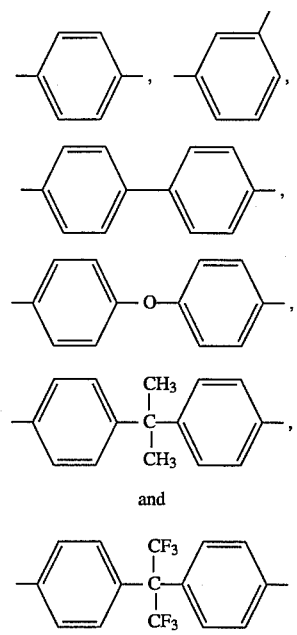

wherein at least one X per polymer chain is $N_3$, and from one to about three X per polymer repeat unit is $N_3$, the remainder of X being H or halogen, and B) an azide substituted bisphenol polysulfone containing a polymer repeat unit of formula (II):

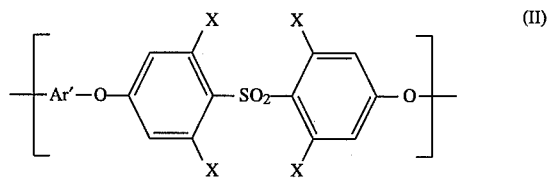

wherein Ar' is a substituted radical selected from the group consisting of:

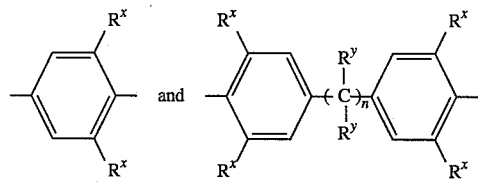

wherein $R^x$ is azide, hydrogen, alkyl or halogen; $R^y$ is lower alkyl, halogenated lower alkyl or aryl; n is zero or one and wherein at least one X and/or $R^x$ per polymer chain is $N_3$, and from one to about three X and/or $R^x$ per polymer repeat unit is $N_3$, the remainder of X and/or $R^x$ being hydrogen, alkyl or halogen.

2. An azide-substituted aromatic polymer according to claim 1 containing repeat units of the formula

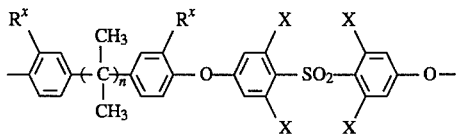

wherein $R^x$ is azide, hydrogen, alkyl or halogen; n is zero or one and wherein at least one X and/or $R^x$ per polymer chain is $N^3$, and from one to about three X and/or $R^x$ per polymer repeat unit is $N^3$, the remainder of X and/or $R^x$ being hydrogen, alkyl or halogen.

3. An azide-substituted bisphenol polysulfone according to claim 1, containing repeat units of the formula

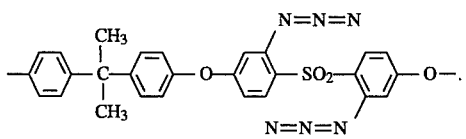

4. An azide-substituted bisphenol polysulfone according to claim 1, containing repeat units of the formula

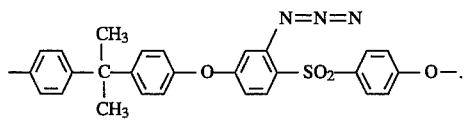

5. An azide-substituted biphenol polysulfone according to claim 1, containing repeat units of the formula

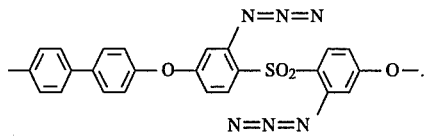

6. An azide-substituted biphenol polysulfone according to claim 1, containing repeat units of the formula

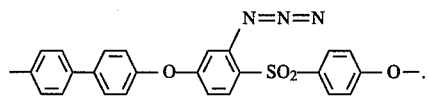

7. An azide-substituted bisphenol polysulfone according to claim 1, containing repeat units of the formula

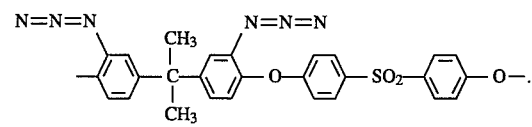

8. An azide-substituted bisphenol polysulfone according to claim 1, containing repeat units of the formula

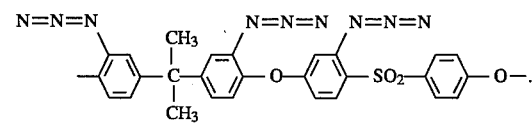

* * * * *